United States Patent [19]

Kleinmeyer et al.

[11] 3,816,707

[45] June 11, 1974

[54] EMBOSSED CARD READER

[75] Inventors: Vernon T. Kleinmeyer; Thomas J. Schinner, both of Cincinnati, Ohio

[73] Assignee: Cincinnati Time Recorder Company, Inc., Cincinnati, Ohio

[22] Filed: Mar. 2, 1973

[21] Appl. No.: 337,451

Related U.S. Application Data

[63] Continuation of Ser. No. 143,573, May 14, 1971, abandoned.

[52] U.S. Cl.235/61.11 C, 235/61.11 R, 235/61.7 B, 101/47, 200/46, 340/149 A

[51] Int. Cl...... G06k 7/04, B41l 45/02, H01h 43/08

[58] Field of Search........ 101/47; 40/2.2; 200/46 R; 235/61.11 R, 61.11 C, 61.11 D, 61.11 B, 61.7 B; 234/35; 340/149 A

[56] References Cited

UNITED STATES PATENTS

| | | | |
|---|---|---|---|
| 2,273,740 | 2/1942 | Terry | 101/170 |
| 3,037,694 | 6/1962 | Seymour | 235/61.11 C |
| 3,048,097 | 8/1962 | Miller | 101/47 |
| 3,340,384 | 9/1967 | Rosen | 235/61.11 C |
| 3,399,473 | 9/1968 | Jaffe | 40/2.2 |
| 3,519,202 | 7/1970 | Rogers | 234/35 |
| 3,519,767 | 7/1970 | Sinker | 200/46 R |
| 3,573,731 | 4/1971 | Schwend | 340/149 A |
| 3,624,360 | 11/1971 | Collier | 235/61.11 R |
| 3,626,159 | 12/1971 | Chumley | 235/61.11 R |
| 3,665,161 | 5/1972 | Oberhart | 235/61.7 B |

OTHER PUBLICATIONS

A. D. Wolfheimer, "Badge Reading Apparatus," IBM Technical Disclosure Bulletin; Vol. 4, No. 3, p. 18, Aug. 1961.

*Primary Examiner*—Daryl W. Cook
*Assistant Examiner*—Robert M. Kilgore
*Attorney, Agent, or Firm*—Wood, Herron & Evans

[57] ABSTRACT

A reader particularly for cards that are embossed with bar coded information reads the information from the cards by scanning the underside of the card with feeler fingers which engage in the depressions of the underside of the code bars to advance switches to positions which decode the encoded information. A coding method in which the information is carried in the distance that a code bar is spaced along a scanning path is provided.

6 Claims, 29 Drawing Figures

GROUP DIGITS HAVING:

(A) A BIT IN ROW 305 – 1,3,5 & 8
(B) A BIT IN ROW 305 BUT NO BIT IN ROW 304 – 1,3 & 8
(C) A BIT IN ROW 304 – 4,5,6 & 0
(D) A BIT IN ROW 304 BUT NO BIT IN ROW 305 – 4,6 & 0
(E) NO BIT IN ROW 305 – 2,4,6,7,9 & 0
(F) NO BIT IN ROW 304 – 1,2,3,7,8 & 9
(G) ANY NUMBER – 1,2,3,4,5,6,7,8,9 & 0

| | GROUP | DIGIT | BAR | SWITCH POSITION | TIME OF DAY |
|---|---|---|---|---|---|
| 1 | GGGGGCB | 2916048 | | 289-2, 291-1 | 6-9 AM |
| 2 | GGGGCFB | 1674091 | | 289-3, 291-1 | 9-10AM |
| 3 | GGGCFFB | 3626788 | | 289-4, 291-1 | 10-11 AM |
| 4 | GGCFFFB | 6001333 | | 289-5, 291-1 | 11AM-12 |
| 5 | GCFFFFB | 7473918 | | 289-6, 291-1 | 12-1 PM |
| 6 | CFFFFFB | 5192211 | | 289-7, 291-1 | 1-2 PM |
| 7 | GGGGGAD | 2711086 | | 289-1, 291-2 | 2-3 PM |
| 8 | GGGGAED | 9166120 | | 289-1, 291-3 | 3-4 PM |
| 9 | GGGAEED | 3845240 | | 289-1, 291-4 | 4-5 PM |
| 10 | GGAEEED | 2134094 | | 289-1, 291-5 | 5-6 PM |
| 11 | GAEEEED | 7390766 | | 289-1, 291-6 | 6-7 PM |
| 12 | AEEEEED | 1409674 | | 289-1, 291-7 | 7PM-MID-NIGHT |

EMBOSSED CARD READER

This is a continuation of application, Ser. No. 143,573, filed May 14, 1971, now abandoned.

The present invention relates to the reading of coded information from cards and particularly to the reading by mechanical means, information embossed upon plastic cards and the like.

Many applications of various types require that coded information be read from records in card type form. In some systems, particularly credit card systems, security systems, and vending systems, it is desirable that information be coded upon durable cards and in a permanent form, in addition to being automatically readable.

Typically, automatic reading devices have been complex and expensive. Some such systems have provided visual information upon cards which can be read through optical means. Other systems used punched cards which are readable by suitable reading devices for such tickets. Other systems have employed magnetically coded information upon cards readable by suitable magnetic reading means.

Accordingly, it is a principle objective of the present invention to provide a code method for cards which is easily readable by mechanical means, and to further provide a rugged and durable electromechanical reader for such code.

It is a particular objective of the present invention to provide a reader of this type capable of reading information embossed upon plastic cards in bar code form.

Accordingly, the present invention provides a system of embossing information upon cards wherein the coding may be conventional in bar code form which may be used to vary other information. This information is furthermore readable preferably on a card reader which employs mechanical fingers which scan the underside of the card along predetermined paths as the card is inserted into a reader. The fingers are mechanically connected to the movable contact set of a multiple contact switch.

As the card is inserted toward a final position, the switch is moved successively through a plurality of switch positions. The position of the switches when the card reaches its full extent within the slot are determined by the positions of the first notches along the paths. Different contacts of different switches are connected in series in such a way that one of the switches is used to actuate groups of contacts on other switches and to verify that the setting of the other switches are the result of a valid code.

The present invention finds particular utility in automatic parking charge systems, and it is in this environment that the present invention is described.

The parking system described utilizes permanently encoded reusable tickets which are dispensed from a magazine having a plurality of compartments, each containing a supply of reusable tickets with prerecorded automatically readable information contained thereon corresponding to the specific period of time during which the ticket was issued. The dispenser is synchronized with a timer to cause the automatic dispensing of tickets from the selected compartment which contains tickets having the appropriate prerecorded information indicative of the time of issue of the ticket. Each of the supplies of tickets within the magazine contains only tickets indicative of a given period of time, and each of the supplies corresponds to a different period of time.

The information is coded upon the tickets in a form which is according to principles of the present invention, and the cards are read on a card reader which embodies principles of the present invention.

This information which is read is compared with the time of the ticket's surrender, as indicated by a clock, and the elapsed time is used as a basis for computing an amount due which is displayed to the customer. A cash receiver device accepts a cash payment from the customer and determines when the amount of the payment has reached the amount due. When it does, the system executes an operation which authorizes the departure of the customer from the premises. Alternatively, the system may issue a receipt which may be deposited at the exit gate to automatically open the gate.

In addition to the use of the present invention is connection with unattended parking lots and garages, it may also be used in any application where it is desirable to realize the advantages of having durable cards with permanently encoded information thereon which is readable by a rugged, economical, and reliable reader such as a mechanical or an electromechanical reader.

These and other objects and advantages of the present invention will be more readily apparent from the following detailed description of the drawings illustrating one preferred form of a fee computing system embodying a card reader and coding system according to principles of the present invention, in which:

FIG. 17 is a cross-sectional view taken just beneath the cover plate along line 17—17 of FIG. 12;

FIG. 27 is a symbolic logic diagram illustrating the function and operation of the pay station control circuitry of FIGS. 22–26.

GENERAL DESCRIPTION OF SYSTEM

Figure 1:
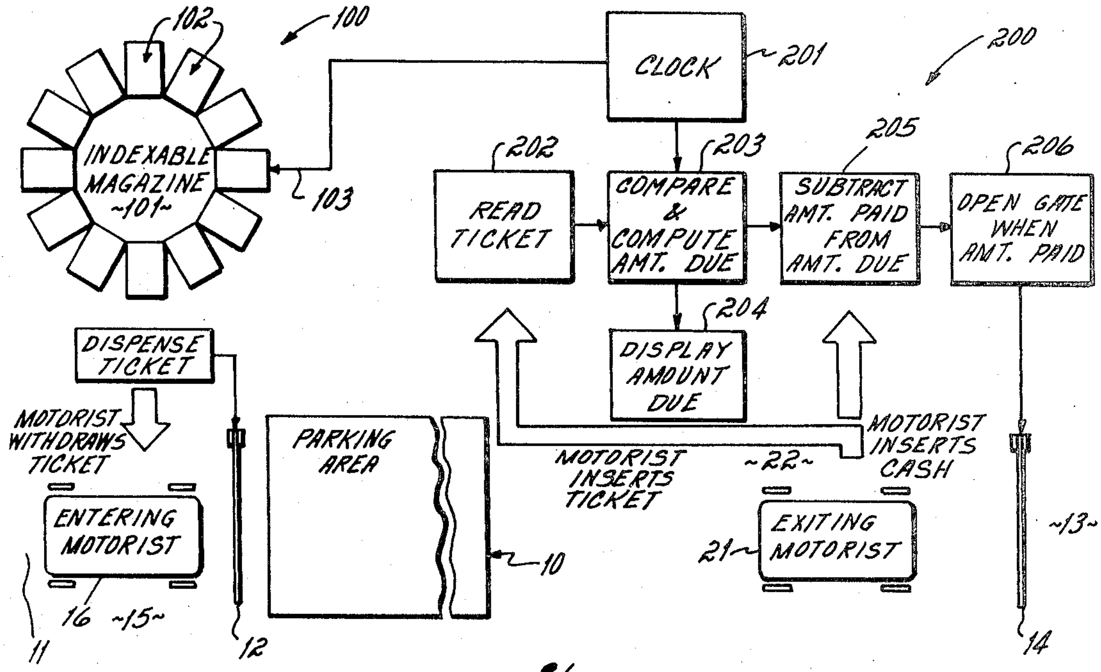
FIG. 1 is a block diagram of an automatic parking garage fee computing system employing a reader and coding system according to an embodiment of the present invention.

The preferred embodiment of a system according to the present invention is generally illustrated in the block diagram of FIG. 1 in connection with an automated parking lot or parking garage having a parking area 10. Entry to the area 10 is obtained via an entrance ramp 11 from which access to the area 10 is controlled by a power operated entry gate 12. Automobile departure from the area 10 is achieved by way of an exit ramp 13, access to which is controlled by a power actuated exit gate 14. At the entrance ramp 11 adjacent the entry gate 12 is a ticket dispensing area 15 at which an entering motorist 16 must stop prior to gaining entry to the parking area 10. At the area 15, the motorist 16 must obtain a ticket in order to open the entry gate 12 which blocks his entry to the parking area 10. The ticket bears a record of the time it was dispensed to the entering motorist 16. The ticket is automatically dispensed by a ticket dispenser 100. The ticket dispenser 100 operates to dispense a ticket to the motorist in response to a signal which is generated by electrical circuitry at the entrance area 15 in response to the presence of the motorist's vehicle at the area 15. When the motorist withdraws the ticket from the dispenser 100, the dispenser 100 automatically actuates the entry gate 12 to raise the gate and admit the motorist to the parking area 10.

When an exiting motorist 21 wishes to leave the parking area 10, he drives his car to a pay area 22 near the exit gate 14 which blocks his passage from the parking area 10 to the exit ramp 13. At the exit area 22, the exiting motorist 21 inserts the ticket, which he had obtained upon entry to the lot, into a ticket reader slot in a pay station 200. The pay station 200 automatically compares the time of entry recorded upon the ticket with the real time of day, computes the amount that the motorist owes, and displays this amount to the motorist. The motorist then inserts the amount that he owes in cahs into a cash acceptor at the pay station 200. The pay station 200 will acknowledge receipt of the full amount when paid by authorizing the motorist's departure from the area 10, such as by automatically opening the exit gate 14, giving the exiting motorist access to the exit ramp 13.

The ticket dispenser 100 is provided with an indexable magazine 101 which is provided with a plurality of ticket compartments 102. Each of the compartments 102 contains a supply of tickets corresponding to a different period of time, and each of the tickets within a given compartment has recorded thereon information indicative of the period of time to which that compartment corresponds. The dispenser 100 will automatically dispense a ticket to an entering motorist from a selected one of the compartments 102. Selection of the compartment is achieved in accordance with the time of day by indexing the magazine 101 in response to control signals through a clock input 103.

The pay station 200, according to one embodiment of the present invention, includes a clock 201 which synchronizes the indexing of the dispenser 100 and computation performed by the pay station 200 in accordance with real time. The clock 201 has its outputs connected to the input 103 of the dispenser 100 and to the fee computing portion of the pay station 200. To provide a customer grace period and thereby relieve high charges for customers who enter near the end of one time period and exit just after the beginning of the next, the output to the pay station may lag the output to the dispenser by, for example, one-half hour. The fee computing portion includes a ticket reader 202 which accepts the ticket from the exiting motorist 21 and reads the motorist's entry time as recorded on the ticket issued him when he entered. The information read from the ticket by the ticket reader 202 is communicated to a computation module 203 which compares the entry time from the ticket with the real time as determined by the clock 201 at the time the ticket is read. The computing module 203 converts the time difference into a monetary figure representative of the charge for that amount of time and displays the amount due to the motorist on a display device 204. The pay station 200 is also provided with a cash receiver device 205 into which the exiting motorist 21 may deposit the amount displayed to him to obtain access to the exit ramp 13. The cash receiver mechanism 205, in conjunction with the computing module 203, determines when the amount displayed on a display device has been paid. When it has, a vending control 206 is actuated to authorize the motorist's exit from the parking area 10.

Figure 2A:
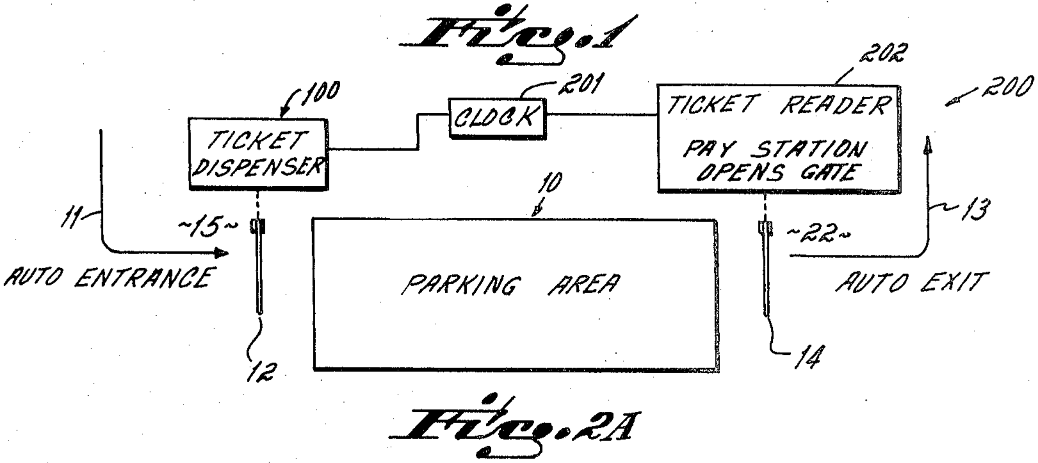
FIGS. 2A and 2B are alternative arrangements of systems of FIG. 1.
Figure 2B:
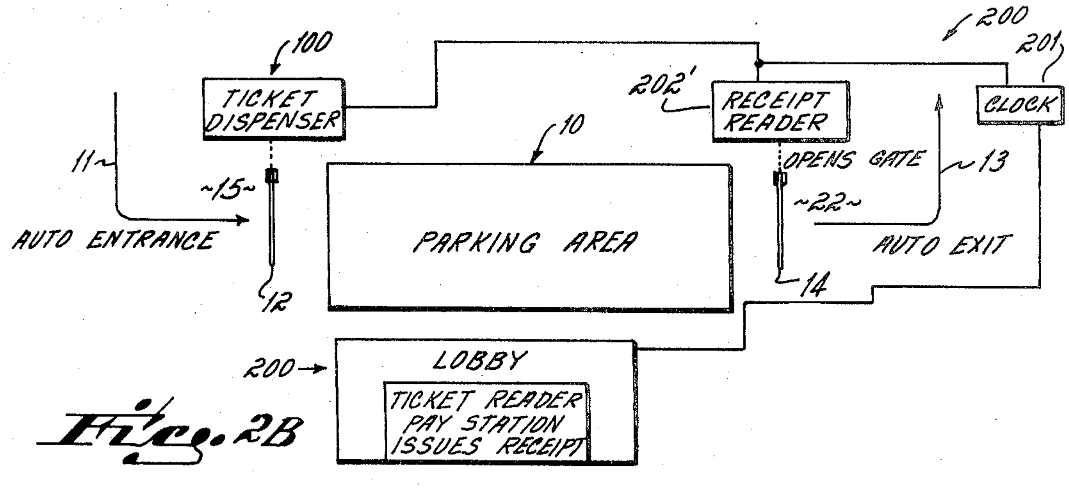

Two of the general embodiments of the system as set forth thus far in FIG. 1 are illustrated in FIGS. 2A and 2B. Referring to FIG. 2A, the parking area 10 having the entrance ramp 11 and an exit ramp 13 is illustrated with a ticket dispenser 100 positioned adjacent the ticket dispensing or entry area 15 to dispense the ticket to the entering motorist at the area 15 and to thereafter actuate and raise the entry gate 12. The pay station 200 is located adjacent the pay area 22 and operates to receive the motorist's ticket and the payment due for the time during which he was parked, and, in response to receipt of the payment, actuates the exit gate 14 to allow the motorist to depart by way of the exit ramp 13.

FIG. 2B illustrates an alternative arrangement to which the system of FIG. 1 may be applied. In this embodiment, the parking area 10 having an entrance ramp 11 and an exit ramp 13 is provided with a ticket dispenser 100 arranged, as in FIG. 2A, adjacent the ticket dispensing area 15 in a manner which allows it to control the operation of the entry gate 12. However, in this embodiment, the pay station 200 is located in a pedestrian lobby which may be in the lobby of the parking garage, or in the lobby of one of the buildings served by the parking area 10. The pay station 200 operates in the same manner as the pay station of FIG. 2A; however, instead of opening the exit gate 14 upon receipt of payment, the unit 200 issues a receipt. This receipt may be in the same form as the ticket dispensed by the ticket dispenser 100 and has recorded on it the time that it was dispensed. The receipt is valid only for a short period of time which is sufficient to allow the motorist to remove his car from the parking area 10 and proceed to the exit gate 22. At the exit area 22, a receipt ticket reader 202′ is provided to accept the receipt, read the time encoded upon it, compare the time read with the real time from the clock 201, and, if the receipt is still valid, to actuate the exit gate 14. By this arrangement, a motorist may park at the area 10, and, upon returning to remove his car, may pay his fee at the pay station 200 in the lobby. The arrangement of FIG. 2B allows the use of a single pay station for multiple exit gates and allows the motorist to proceed more quickly through the exit gate by relieving him of the necessity to deposit his cash from his automobile.

Figures 3, 3A:
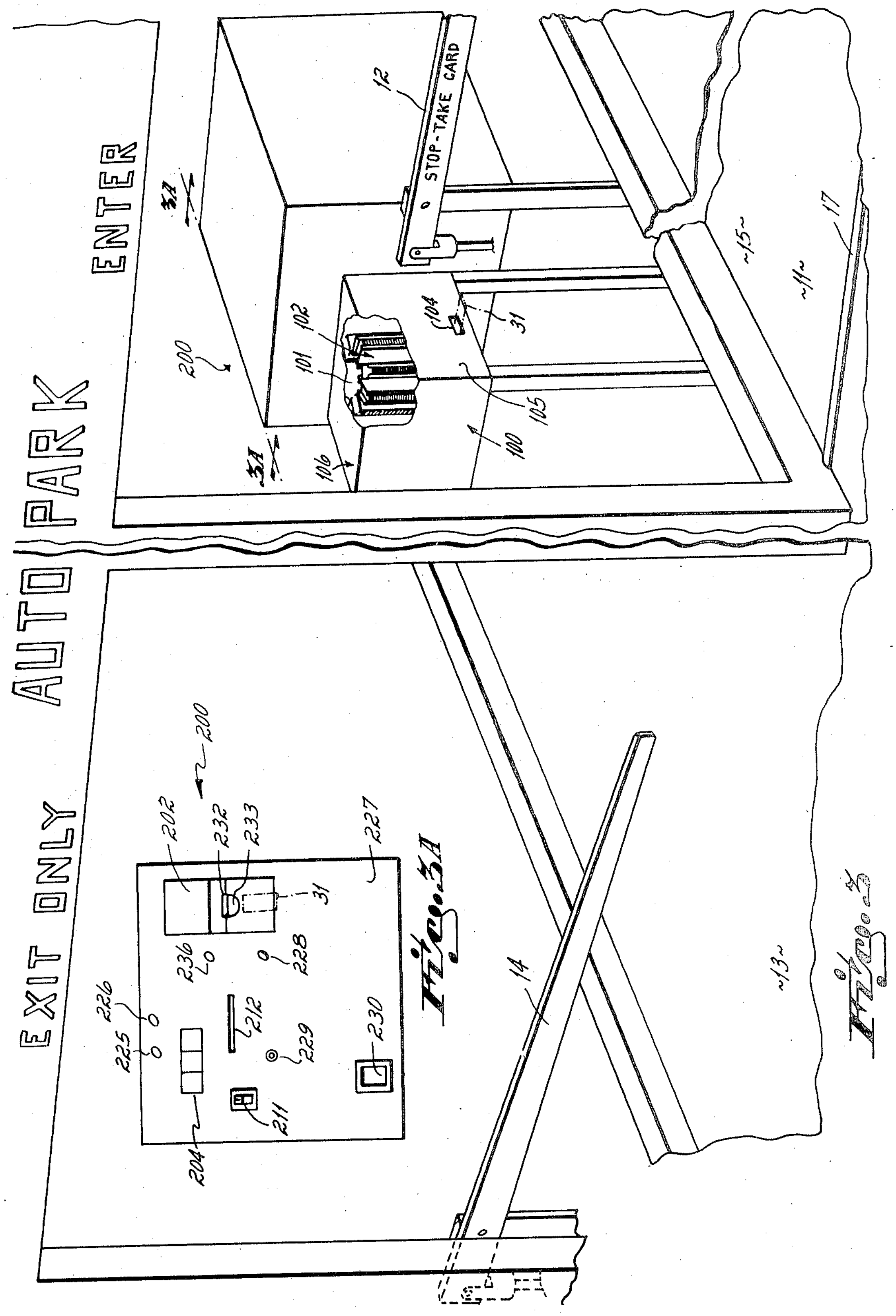
FIG. 3 is a perspective illustrating a ticket dispenser and a pay station according to one possible arrangement of the system of FIG. 1.
FIG. 3A is an elevational view of the panel of the pay station of FIG. 3.

Referring to FIG. 3, the dispenser 100 and the pay station 200 according to the arrangement shown in FIG. 2A is illustrated for use with a parking garage in which the entrance ramp 11 and the exit ramp 13 are adjacent. As shown in FIG. 3, the dispenser 100 is positoned adjacent the dispensing area 15 which is provided with means which may include electric eye detectors or magnetic loop pick-ups 17 for detecting the presence of an entering automobile at the area 15. The dispenser 100 is provided with a rotatable magazine 101 having a plurality of compartments 102 from which a ticket 31 is automatically dispensed through a slot 104 upon detection of the presence of an automobile at the area 15. When the ticket 31 is withdrawn from the slot 104 by the motorist, the dispenser 100 actuates a mechanism to raise the gate 12 to allow the motorist to enter the parking garage. At the exit area 22, as best shown in FIG. 3A, the pay station 200 receives the ticket 31 through the ticket reader 202 to compute and display the amount due on the display device 204. The motorist may deposit cash in the form of coins through the coin slot 211 or currency through the bill receiving slot 212 which, by decrementing the display counter 204 until the amount due is reduced to zero, executes a signal authorizing the motorist to leave the parking area, which signal operates to raise the exit gate 14. Change is also given to the motorist if required. For this purpose, the specific embodiment illustrated herein is provided means for returning change of from one to four nickles for overpayment made in coin. While no means are shown for comparting and returning change for currency deposited, it is understood that this provision could be added.

The pay station 200 is provided with other controls and indicators on the face of the control panel 210. These include a lost card push-button 228 which is used in lieu of the insertion of a card to assess the exiting motorist a fee, usually the maximum fee, if he has lost his ticket. Also provided is a cash return push button 229, a coin return slot 230, "fee paid," "use correct change only," and "card in wrong" indicator lights 225, 226, and 236 respectively, and a bent coin release (not shown). The details of operation of one preferred embodiment of the system, along with the operation of the preferred embodiment, is set forth in detail below.

DESCRIPTION OF TICKET DISPENSER

Figures 4, 5, 6:
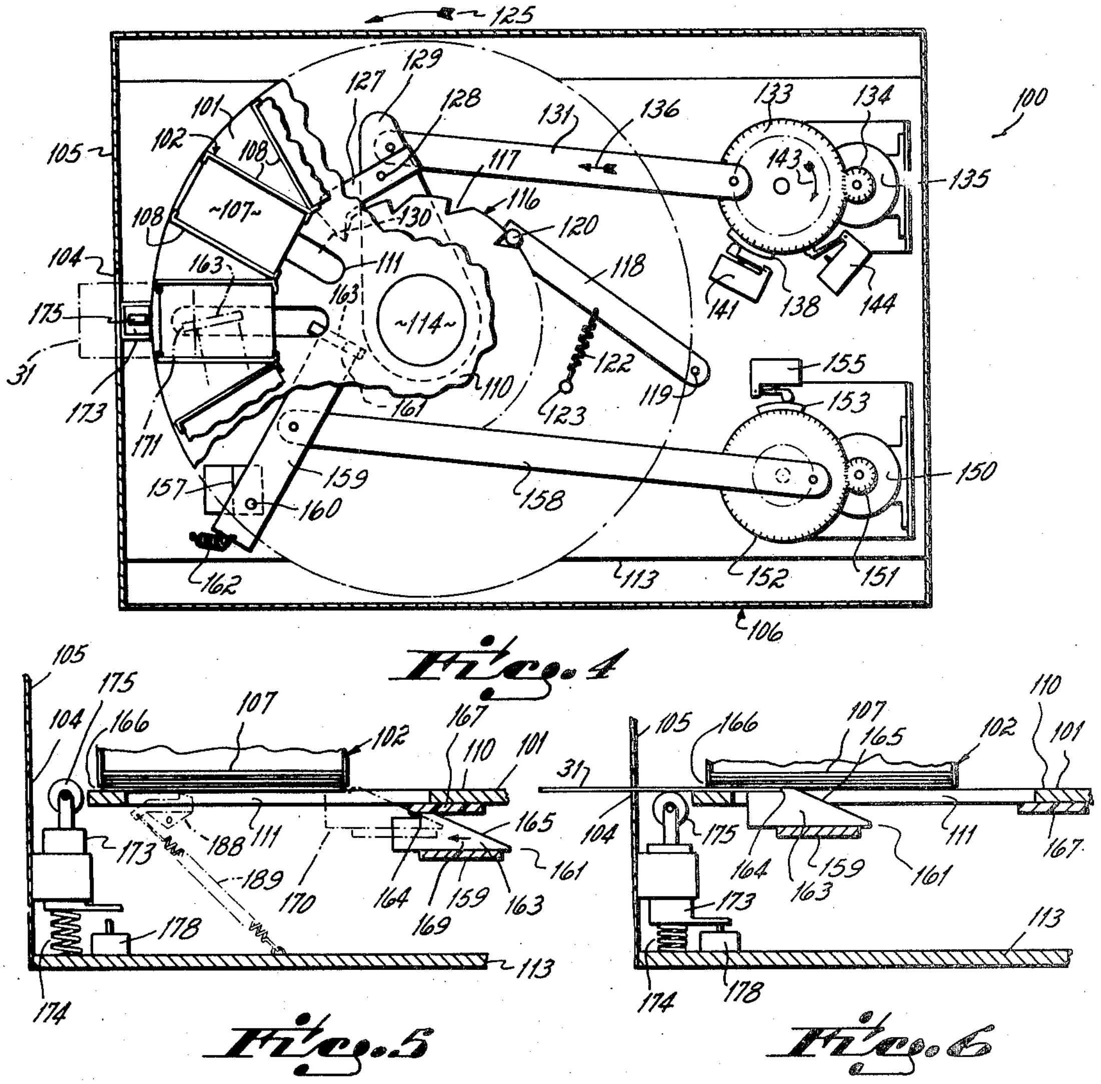
FIG. 4 is a horizontal view, partially broken away, of a ticket dispenser of FIG. 3.
FIG. 5 is an elevational cross sectional view through the dispensing mechanism of FIG. 4 illustrating the mechanism in a de-actuated condition.
FIG. 6 is a view similar to FIG. 5 illustrating the dispensing mechanism in an actuated conditon.

The ticket dispenser 100 is illustrated in FIG. 4 with a circular magazine 101 having a plurality of circumferentially spaced and radially aligned ticket compartments 102. The dispenser 100 is provided with an output dispensing slot 104 in the front panel 105 thereof forming part of the cabinet 106. The slot 104 and the panel 105 face toward the ticket dispenser area 15. The dispenser 100 is adapted to dispense a ticket 31 through the slot 104 toward a vehicle positioned at the dispensing area 15.

The circular magazine 101, in the embodiment illustrated, is provided with twelve of the bins or compartments 102. Each of these compartments is adapted to carry a stack of similar or identical rectangular shaped tickets 107. Each of the compartments 102 is in the form of a vertically oriented stacking tray 108 made up of a pair of channel shaped side sections, the traps being rectangular in cross-section and mounted upon the circular base plate 110. The plate 110 has twelve radial slots 111 therein. The trays 108 are rigidly mounted on the plate 110, one spaced symmetrically about each of the slots 111. The circular base plate 110 is pivotally mounted on the top of a cabinet base plate 113 which forms a rigid part of the cabinet 106. The base plate 110 is, for this purpose, supported on a bearing shaft 114 which also supports, intermediate of the plate 113 and the plate 110, a circular ratchet disk 116. The disk 116 has, uniformly spaced about the circumference thereof, twelve unsymmetrical V-shaped notches 117. A locking lever 118, pivotally mounted at point 119 to the base 113, is provided with a detent roller 120 at the other end which is adapted to drop into the notches 117 to lock the plate 116 in any one of twelve positions corresponding to the twelve positions of the different compartments 102 adjacent the dispensing slot 104. The lever 118 is spring biased by a tension spring 122 attached between the mid-point of the lever 118 and a point 123 on the base 113 so that the detent roller 120 rides against the rim of the disk 116.

A ratchet pawl mechanism is provided for indexing the magazine 101 by sequentially advancing the compartments 102 past the slot 104 in the direction shown by the arrow 125. This pawl mechanism includes a ratchet pawl 127 which is pivotally mounted at point 128 to a pawl arm 129 which is pivotally mounted to the shaft 114. The pawl end 130 is biased under the influence of a spring (not shown) into engagement with the notches 117 in the circumference of the disk 116. The arm 128 is oscillatably driven by a linkage 131 pivotally connected at its opposite ends between the lever 129 and an eccentrically positioned pinion and gear wheel 133. The gear wheel 133 is driven by another gear 134 on the shaft of an electric motor 135. When motor 135 is energized, the resulting rotation of the gear wheel 133 rocks the linkage 131 and oscillates the arm 129 to advance the magazine 101 when the arm 131 is moving in the direction of the arrow 136, with the pawl end 130 engaged in a notch 117 of the disk 116. When the linkage 131 is moving opposite the direction of the arrow 136, the pawl end 130 will slip to the next notch 117 as the detent 120 prevents backward rotation of the magazine 101. A cam 138 is concentrically mounted on the shaft of the gear wheel 133 and is shown in the position that it will be in when the motor 135 is de-energized. In this position, it opens the normally closed contacts of a limit switch 141. When the motor 135 is energized, the gear wheel 133 rotates in the direction of the arrow 143. At a small angle upstream of the limit switch 141, in the path of the cam 138, is a normally closed limit switch 144. The operation of these limit switches in the control of the machine will be best illustrated in connection with the logic and wiring diagrams of FIGS. 7 and 8 below.

Another motor, 150, is provided to drive the ticket dispensing mechanism through its output gear 151 which drives a gear wheel 152 to which is concentrically mounted a cam 153 shown in its normal position in FIG. 4, when the motor 150 is de-energized. In this position, the cam 153 opens the normally closed contacts of a limit switch 155. Pivotally attached at one end to an eccentric point on the gear wheel 152 is a linkage arm 158 which is pivotally attached at its opposite end to the midpoint of a lever arm 159 which is in turn pivotally attached at point 160 to a bracket 157 fixed to the base 113. A free end 161 of lever 159 is adapted to move in the slot 111 beneath the compartment 102 which is located adjacent slot 104 when arm 158 is rocked by energization of the motor 150. The lever 159 underlies the disk 110 and is biased upwardly against the disk by a spring 162 for which purpose it is mounted above the base 113 by bracket 157 and secured loosely on its axis 160.

The operation of the lever 159 in dispensing tickets is better illustrated in FIGS. 5 and 6. Referring to FIG. 5, the lever 159 is illustrated in its rest position of FIG. 4. To the free end 161 of the lever 159 is mounted a feed finger 163 provided with a notch 164 in the upper surface thereof and an upper cam surface 165. The tray 108 is provided with a slot 166 at the base of its outer edge adjacent the slot 104 in the front panel 105. The width of the slot 166 is greater than the thickness of one of the cards in the stack 107 but less than the thickness of two of the cards so that it may serve to separate the cards individually from the bottom of the stack to feed them through the slot 104. The plate 110, upon which the trays 108 are mounted, is illustrated with one of its slots 111 positioned in alignment with the feed finger 163. With the lever arm 159 in its retracted position (as shown), the feed finger 163 is biased downwardly by a plastic ring 167 mounted to the underside of the circular base plate 110. When the lever 159 is advanced in the direction of the arrow 169, the feed finger 163 moves to the left in FIG. 5 and upwardly to the position illustrated at 170, where the notch 164 may engage the inward edge of the lowermost ticket of the stack 107. As the arm 159 advances to its fully extended position (171 in FIG. 4 and that position illustrated in FIG. 6) the lowermost card of the stack 107 is extended through the slot 166 in the tray 108 and is projected outwardly through the slot 104 in the panel 105 as the issued ticket 31. When the issued ticket 31 is present in the slots 166 and 104, a switch actuator 173 is driven downwardly against the force of a spring 174 as the card 31 contacts the roller 175 mounted at the uppermost end of the actuator 173. When the actuator 173 is driven downwardly, the contacts of a normally closed limit switch 178 are opened to indicate that the card 31 is present in the slot. A latch 178 is provided to prevent a card from being pushed back into the slot 104. This latch 178 is biased upwardly into the path of the card, is cammed so as not to interfere with the advancing card, but catches the trailing edge of the card once it is advanced.

Figure 7:
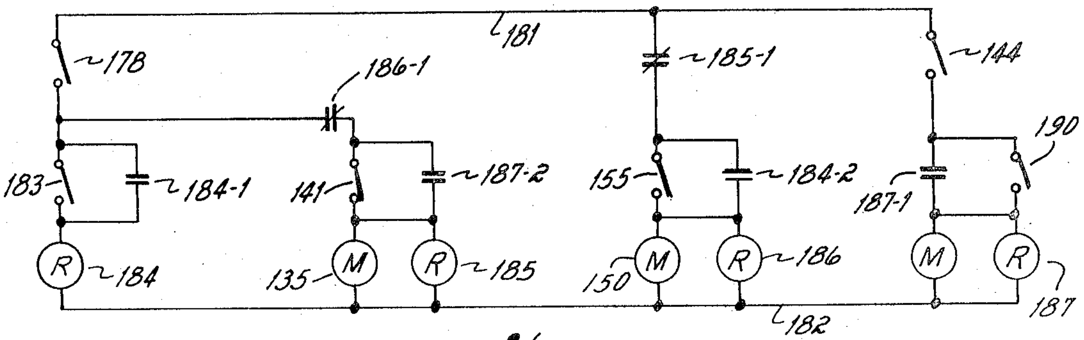
FIG. 7 is a schematic diagram of the control circuitry of the ticket dispenser of FIG. 4.

The control circuit for the dispenser 100 is illustrated in FIG. 7. The control circuit includes a pair of 110 volt AC power leads 181 and 182. The limit switch 178 has one of its terminals connected to the lead 181 and the other connected to one terminal of a switch 183 which is a remotely controlled switch which is closed in response to a signal generated by the entry of a card into the dispensing area 15. The other terminal of the switch 183 is connected through the winding of a relay 184 to the power line 182. Connected across the switch 183 is a set of normally opened contacts 184–1 of the relay 184 which enables the relay 184 to latch itself in an energized state once the switch 183 is momentarily closed. Other relays, 185, 186, and 187 are provided in the control circuit. The relay 185 is connected in series with the limit switch 141 and normally closed contacts 186–1 of the relay 186 and the switch 178 across the power lines 181 and 182. Normally opened contacts 187–2 of the relay 187 are connected across the limit switch 141. Connected across the winding of the relay 185 is the winding of the motor 135. The relay 186 is connected in series with the limit switch 155 and normally closed contacts 185–1 of the relay 185 across the power lines 181 and 182. The normally opened contacts 184–2 of the relay 184 are connected across the limit switch 155, and the winding of the motor 150 is connected across the winding of the relay 186. The winding of the relay 187 is connected in series with contacts 187–1 of the relay 187 and the limit switch 144 between the power lines 181 and 182. Connected across the contacts 187–1 is a remote controlled switch 190 which closes in response to output signals from the clock.

OPERATION OF TICKET DISPENSER

The function and operation of the circuit of FIG. 7 is explained in connection with the logic diagram of FIG. 8. First, a car entering the dispensing area 15 will energize a switch represented at 183 to generate an electrical signal which will pass through a logical OR-gate 191 to an input of an AND-gate 192. As long as there is no card 31 present at this time in the slot 104, the limit switch 178 will be closed and a signal will be present at the other input of the AND-gate 192. Thus the signal from the car entering the switch 183 will pass from the OR-gate 191 through the AND-gate 192 and will energize relay 184 which will latch in the energized condition by feeding back a signal through the OR-gate 191 representing the relay contacts 184–1. The energizing of the relay 184 also causes a signal, represented by closing of the contacts 184–2, to pass through an OR-gate 193 and to enter an AND-gate 194. This signal will normally pass through the AND-gate 194 to energize the relay 186 and the motor 150. If, however, the dispenser magazine is indexing at the time this signal is proceeding, this condition will be represented by the absence of a signal at the negative input of the AND-gate 194 representing a condition in which the contacts 185–1 of the relay 185 are broken. If this is the case, this signal will be stored, as relay 184 will remain energized, until the contacts 185–1 again close indicating that indexing has been completed. When the signal passes through the AND-gate 194 to energize the motor 150, the contacts of the limit switch 155 will close causing a feedback signal to be generated to the OR-gate 193, which keeps the motor running until it has completed a card dispensing cycle. As the motor 150 advances a card 31, the card trips the limit switch 178, removing a signal from the input of the AND-gate 192 to disable the feeding of any more tickets until the ticket 31 within the slot has been removed. The limit switch 178 also supplies an enabling signal to the input of an AND-gate 195 which, when removed by the presence of a card 31 in the slot 104, also disables the indexing operation by disabling the operation of the motor 135. When the relay 186 is energized, indexing of the magazine 101 is also inhibited by a breaking of the normally closed contacts 186–1 of the relay 186 as represented by the feedback loop to the negative input of the AND-gate 195.

Indexing of the magazine 101 is initiated by clock output signals represented at 190 which are emitted from the clock 201 (FIG. 1). These clock signals pass through an OR-gate 196 to the input of an AND-gate 197. If the index motor 135 is in its rest position, the contacts of the limit switch 144 will be closed and the clock signal will pass through the AND-gate 197 to energize the relay 187. When the relay 187 is energized, a feedback signal will cause the relay to latch in its energized condition through the contacts 187–1. The relay 187 supplies a signal through its contacts 187–2 which passes through the OR-gate 198 and to the AND-gate 195, where, as long as a ticket 31 is not present in the slot 104, and as long as relay 186 is not energized indicating that a ticket is currently being dispensed, then the signal will pass through the AND-gate 195 to energize the relay 185 and to energize the indexing motor 135. The energizing of the relay 185, as pointed out above, will disable, through the contacts 185–1, a dispensing of cards while the indexing operation is in progress. When the motor 135 begins to actuate, limit switch 141 closes, causing a feedback signal to be fed back through the OR-gate 198 to maintain the motor 135 in energized condition until the indexing cycle is completed. Also, the actuation of the motor 135 opens the contacts of the limit switch 144, removing the signal from the input of the AND-gate 197, allowing the relay 187 to drop out.

Figures 8, 9:
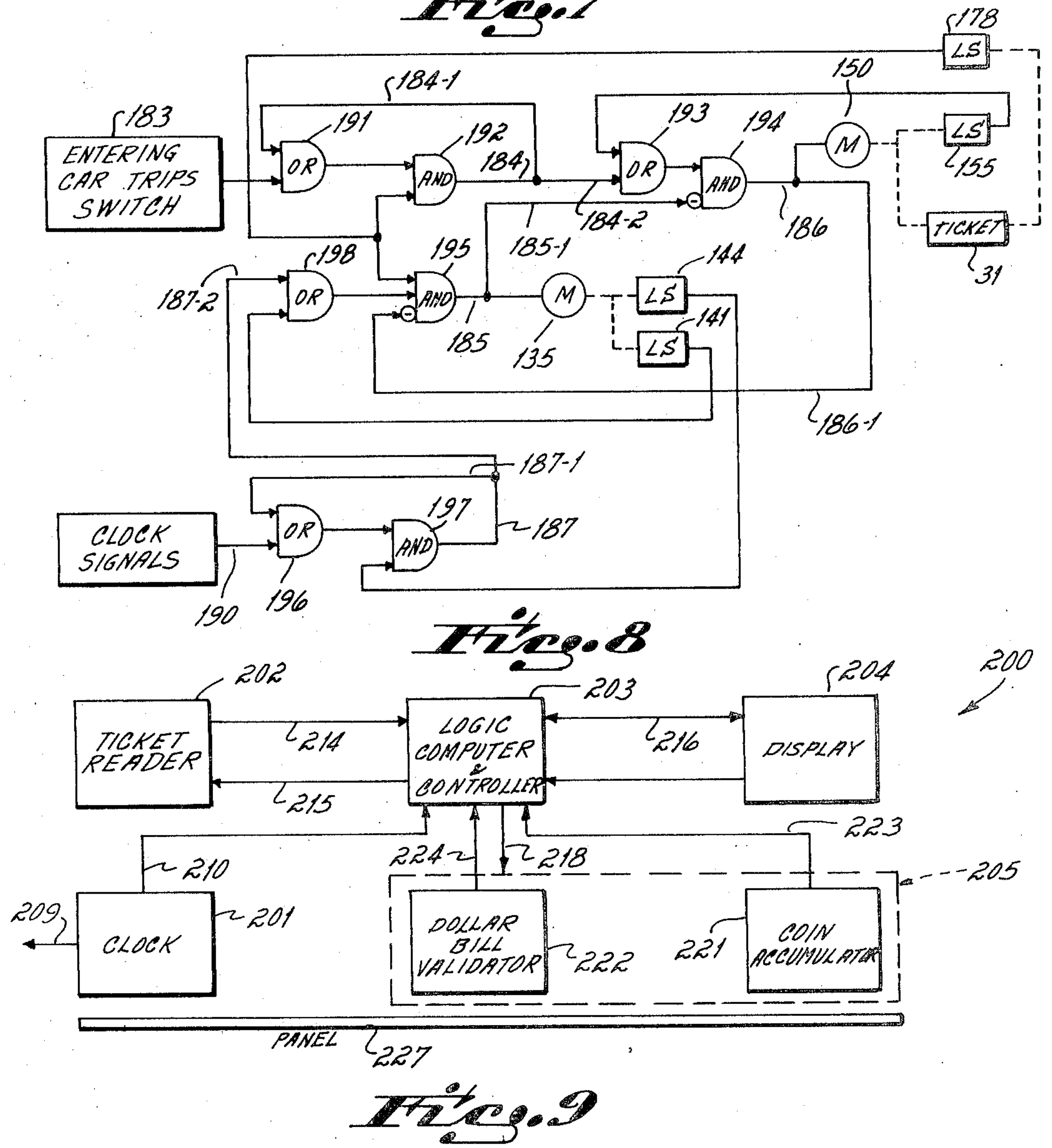
FIG. 8 is a symbolic logic diagram representing the operation of the ticket dispenser of FIF. 4.
FIG. 9 is a block diagram of a pay station of FIG. 3.

While not shown in the diagrams of FIGS. 7 and 8, appropriate conventional circuitry is provided to cause the entry gate 12, if it is desired, to open upon removal of the ticket 31 from the slot 104. This signal may be derived from the limit switch 178.

DESCRIPTION OF PAY STATION

The pay station which was discussed generally in connection with FIGS. 1 through 3A above is illustrated in block diagram form in relation to its operating components in FIG. 9. The pay station 200 includes the clock programmer 201. Briefly, this clock includes a time of day output 210 to the logic and computing module 203 and a pulse output 209 which is connected to the clock input 103 of the dispenser 100. The pulse is generated on the output 209 each time the output on line 210 changes from one level to another so that the dispenser magazine 101 will be indexed in intervals corresponding to the time of day. The clock 201 includes means to program the outputs and to thus divide the day up into preselected time periods. For the example illustrated in the last column of FIG. 11, these indexing pulses will be generated at 6 A.M. and on each hour from 9 A.M. to 7 P.M. Many available commercial clock programmers of this type are suitable for this purpose.

The pay station 200 includes the ticket reader module 202 which is described in detail in connection with FIGS. 11 through 19 below. Generally, the ticket reader 202 reads the ticket 31 which is inserted by an exiting motorist into the pay station, and conveys this information in the form of an electrical signal along a line 214 to the logic and computation module 203. The module 203 returns a signal to the reader 202 along line 215 to actuate a ticket ejector mechanism which drops the inserted ticket into a bin when the fee has been paid to clear the reader for the next exiting customer. The logic and computation module 203 has an electrical output 216 which communicates an electrical signal representative of the amount due to the display module 204. The module 203 also will supply a signal to the cash acceptor 205 along a line 218 when the final fee has been paid in its exact amount and the inserted money may be irrevocably accepted by bypassing the return mechanism which will be included in the cash acceptor 205 and depositing the money in a permanent cash receptacle. The cash acceptor 205 includes a coin accumulator 221 which is of any commercial form. An acceptable coin accumulator mechanism for this purpose is Model 10–01 manufactured by National Rejectors, Inc., 5100 San Francisco Avenue, St. Louis, Missouri 63115. The cash acceptor mechanism 205 may also include a dollar bill validator 222 which may be of any commercial type. A suitable one for this is the model Simplex 200, also manufactured by National Rejectors, Inc. It will be clear that either the coin accumulator 221 or the dollar bill validator 222 may be used either alone or together depending on whether their particular application requires or is intended to accept cash in the form of coins or currency or both. The coin and bill mechanisms 221 and 222 will generate appropriate output signals identifying the amounts which they have received along lines 223 and 224 respectively to the logic module 203. The pay station 200, as pointed out in connection with the FIG. 3B above, includes a panel 227 which is accessible to the customer. The panel 227 includes a manual amount entry button 228 for a lost ticket which will enable the customer to assess himself the maximum fee due in the event he has lost or misplaced his ticket and thus permit his exiting from the parking area. The panel also includes a coin or cash return mechanism actuator button 229 which enables the customer to return his money prior to the final actuation and acceptance of his payment in the event that he has inserted an improper amount of money. It also includes a coin or change return slot 230 from which change is returned to him in the event he does not have the exact change. The panel also includes all indicating lights to tell him that the change capacity of the machine is exhaust and that exact change is required, or that he has inserted his card in the wrong direction or some other improper operation.

TICKET CODING

Figures 10, 11, 12:
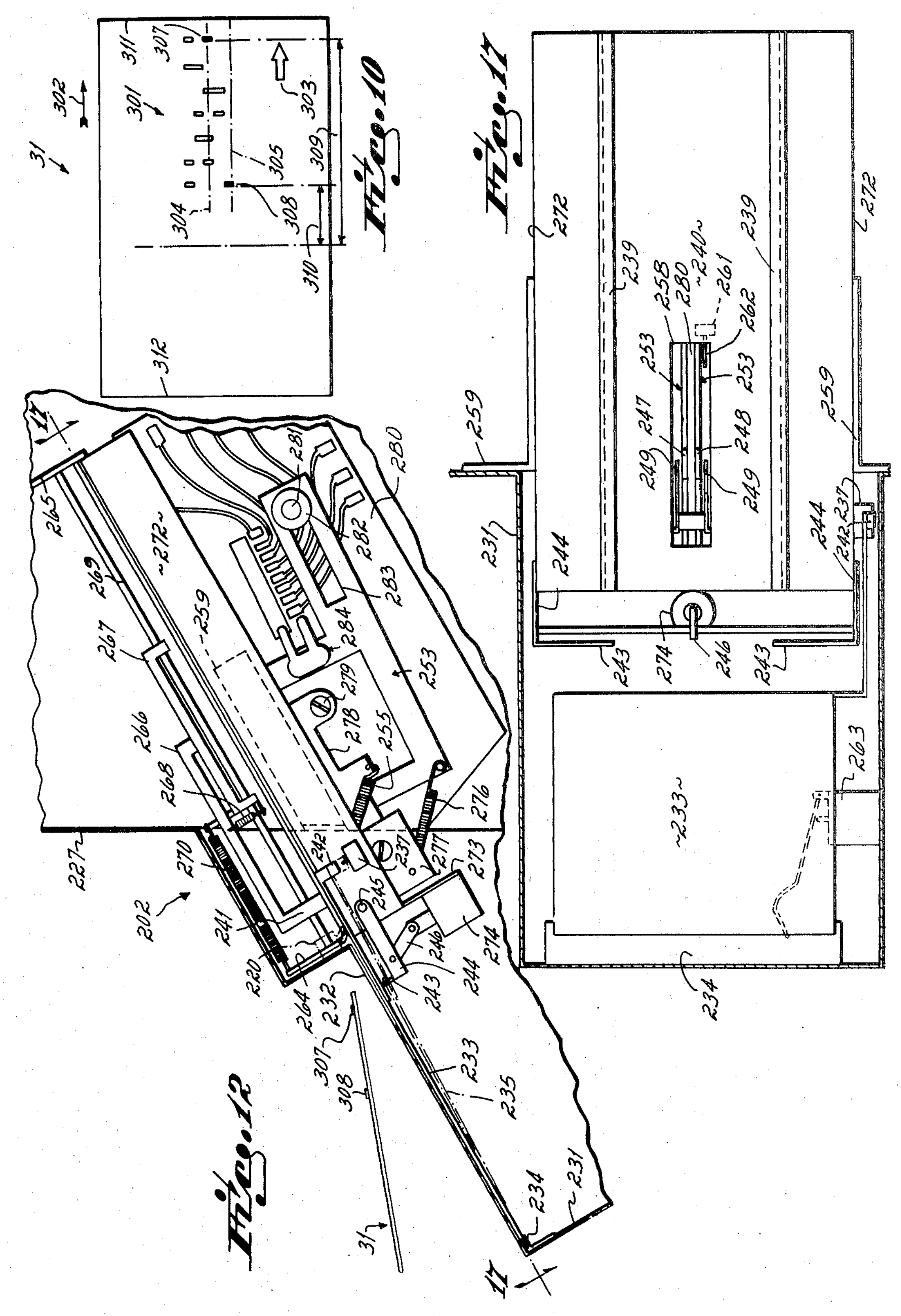
FIG. 10 is a diagram of a sample ticket in the form of an embossed card encoded according to one of the principles of the present invention.
FIG. 11 is a table illustrating one form of code as illustrated on the ticket of FIG. 10.
FIG. 12 is a horizontal cross-sectional view, partially broken away through the pay station of FIG. 3 illustrating particularly the ticket reader.
Figure 11:
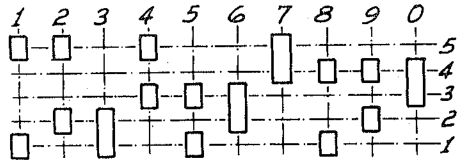

The ticket in the preferred form for use in the present system is illustrated in FIG. 10. The ticket is made of a plastic material such as high impact polystyrene and is in the form of a conventional credit card. According to one aspect of the present invention, information is embossed upon the card and may be in the form of the conventional Addressograph-Multigraph bar code, 301, as illustrated in the figure. However, this information is not read in the conventional manner, but instead is used to generate a unique code for identification of the twelve time periods corresponding to each of the compartments 102 of the dispenser magazine 101 of FIG. 1. This code is illustrated in the table of FIG. 11. The information is read from the card by a pair of sliding switches which are axially displaced in the direction of arrow 302 as the card is inserted into the reader 202 in the direction of the arrow 303. The switches include feeler fingers which are adapted to scan the cards along two lines 304 and 305. The feeler fingers of the switches are adapted to engage in the depressions in the underside of the card of the first notch or bar of the code which they contact as they scan along the lines 304 and 305. These notches which will be engaged are illustrated as notches 307 and 308 in the example of FIG. 10, and will result in a displacement of the switches by the distances 309 and 310. The switch mechanism for translating these distances into digital information is explained in connection with the following FIGS. 12 through 17.

From FIGS. 10 and 11, it can be seen that the only restriction on the coding 301 is that no notch be present to obstruct the paths 304 and 305 between the position of the desired code notches 307 and 308 and the leading edge 311 of the card 31. However, beyond these positions, any information may be encoded upon the card without interfering with the reading of the code for the purposes of the present system. Thus, this other information may be used for other purposes. In FIG. 11, the ten decimal digits are divided into seven groups (a) through (g). As long as the coding on the card is consistent with digits selected from the groups indicated for the various digit positions, any digits may be used in these positions, and any number of additional digits may be used to the left of the seven digit positions shown. Furthermore, while only two paths 304 and 305 are shown, it is to be understood that more than two paths may be used in some applications, and, with the present coding system, up to five paths are available for use. Of course other codes may be used other than the five position bar code shown.

Figure 19:
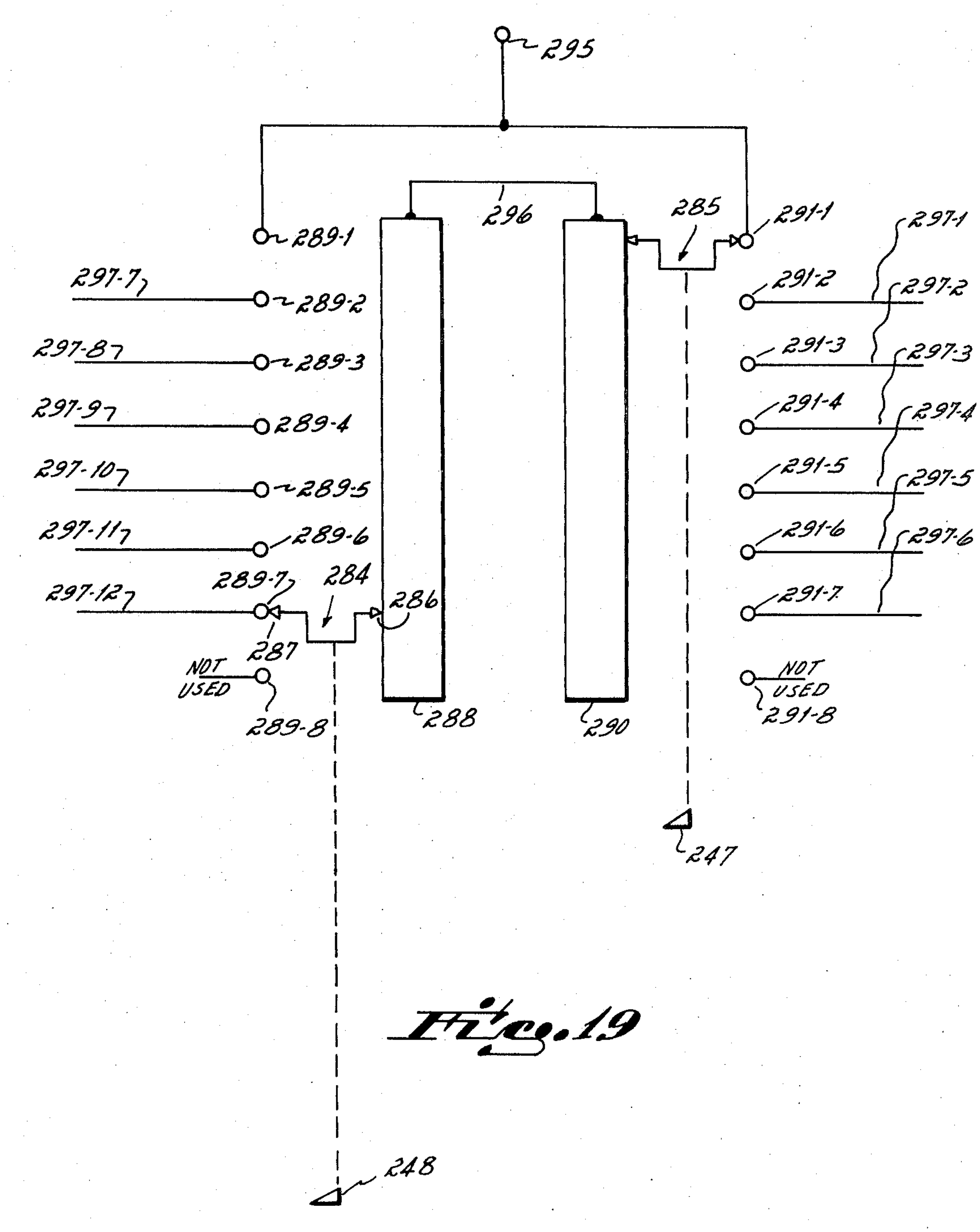
FIG. 19 is a schematic diagram illustrating the wiring of the reader switch of FIG. 16.

The selected code is illustrated in FIG. 11 and is employed to uniquely identify any one of twelve numbers. These numbers have been divided into two groups, the first group including numbers 1 through 6 and the second group including numbers 7 through 12. The groups are identified by the appearance of a bar in the first position of a selected one of the rows 304 and 305, which in the example of FIG. 10 is the bar 307 in row 304, which identifies the number as being from, for example, the first group of numbers, which includes numbers 1 through 6. The bar 308 identifies the one of the numbers 1 through 6 which is to be selected. As an example, if the card code is to indicate number 12, the code on the card will be as shown in line 12 of the table. The first digit may be any digit having a bit in row 305 (group (a), e.g. number 1). The second through the sixth digits may be any five digits not having bits in 305 (group (e), e.g. 40967) and the seventh digit may be any digit having a bit in line 304 but having no bit in line 305 (group (d), i.e. number 4). The switching circuit which generates the code in the form of an electrical signal is illustrated in FIG. 19, described below.

DESCRIPTION OF TICKET READER

The design and operation of the ticket reader 202 will be best understood by reference to FIG. 12, which shows the ticket reader 202 mounted on the panel 227 of the pay station 200. The reader 202 is mounted to the panel 227 in an inclined orientation and includes a housing 231 having an opening 232 therein for receiving tickets 31 to be inserted upwardly and inwardly through the opening 232 into the reader 202. The opening 232 is closed by a plate 233 which is attached to the housing 231 by a leaf spring 234. In FIG. 12, the plate 233 is shown in its closed position biased upwardly against the under surface of the housing 231. The phantom line 235 shows the plate 233 deflected downwardly to the position which it will attain when a card is depressed against it while it is being inserted by the exiting motorist.

Figures 13, 14, 15:
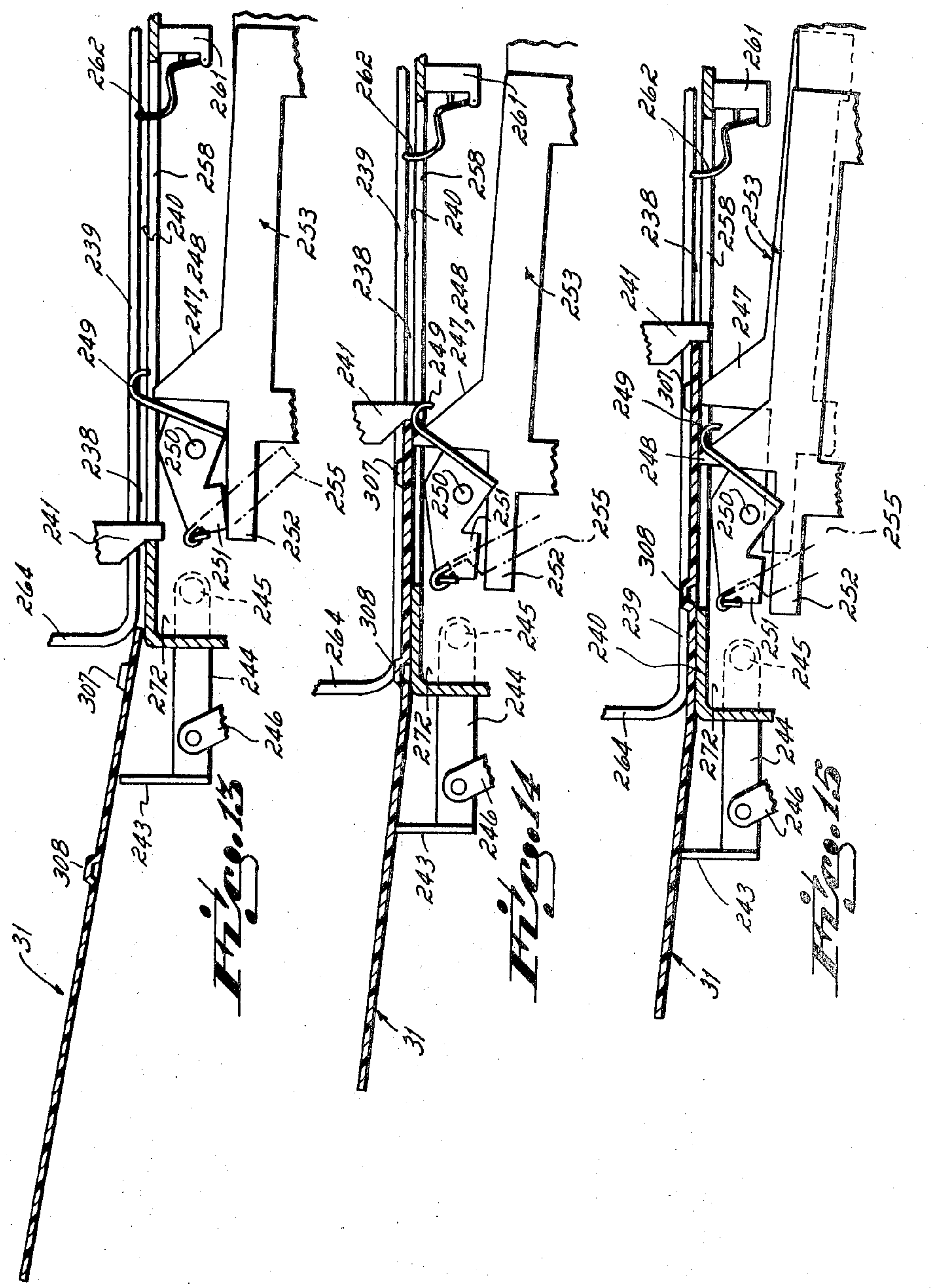
FIG. 13 is a cross-sectional view through the ticket reader of FIG. 12 illustrating a card in position, ready for insertion in the reader.
FIG. 14 is a view similar to FIG. 13 illustrating the card partially inserted into the reader.
FIG. 15 is a view similar to FIGS. 13 and 14 illustrating a card inserted further into the reader.

Insertion of the card can better be understood by reference to FIGS. 13 through 15. Referring to FIG. 13, the card 31 is shown with the coded bars 307 and 308 embossed therein. The card reader 202 includes an internal slot 238 which communicates with the opening 232 and which is formed between the parallel guide plates 239 and 240. An ejector finger 241 extends across the slot 238. The finger 241 is spring-biased such that it will be moved against the force of a spring 270 as the card 31 is inserted into the slot 238 as can be seen by reference to FIG. 16. A card retaining latch 243 is provided mounted on the free end of a lever 244 which is pivotally attached at point 245 which is fixed in relation to the plate 240. The latch 243 serves to catch the trailing edge 312 of the card 31 when it is completely inserted into the slot 238 to retain the card in the slot against the force of the spring-biased ejector finger 241. As will be seen in connection with FIG. 16 below, the latch 243 is spring-biased upwardly and is movable downwardly by a solenoid driven link or lever 246 for ejection of the card into a bin when the payment has been made, or may be manually depressed downwardly by the customer pressing upon the plate 233 if the customer wishes to remove his card prior to completion of his payment. A reader plate switch 237 is provided which is tripped by a lever 242 extending from the plate 233 to monitor the position of the plate 233. A front card limit switch 220 detects the initial pressure of the card in the slot 238.

As the card 31 is inserted into the slot 238, the pair of switch actuator fingers 247 and 248, as shown in their rest position in FIG. 13, are held in this retracted position by a card detector finger 249 which is pivotally mounted at point 250 which is stationary with respect to the plate 240 through an abutment surface 251 which acts upon an extension 252 of the bars 253 which carry the fingers 247 and 248. The bars 253 are biased upwardly by springs 275, 276 (FIG. 16), but the abutment 251 is biased downwardly under the force of a spring 255 which is stronger than spring 276 which biases upwardly the levers 253. As the card 31 is inserted through slot 238 to the position shown in FIG.

Figure 16:
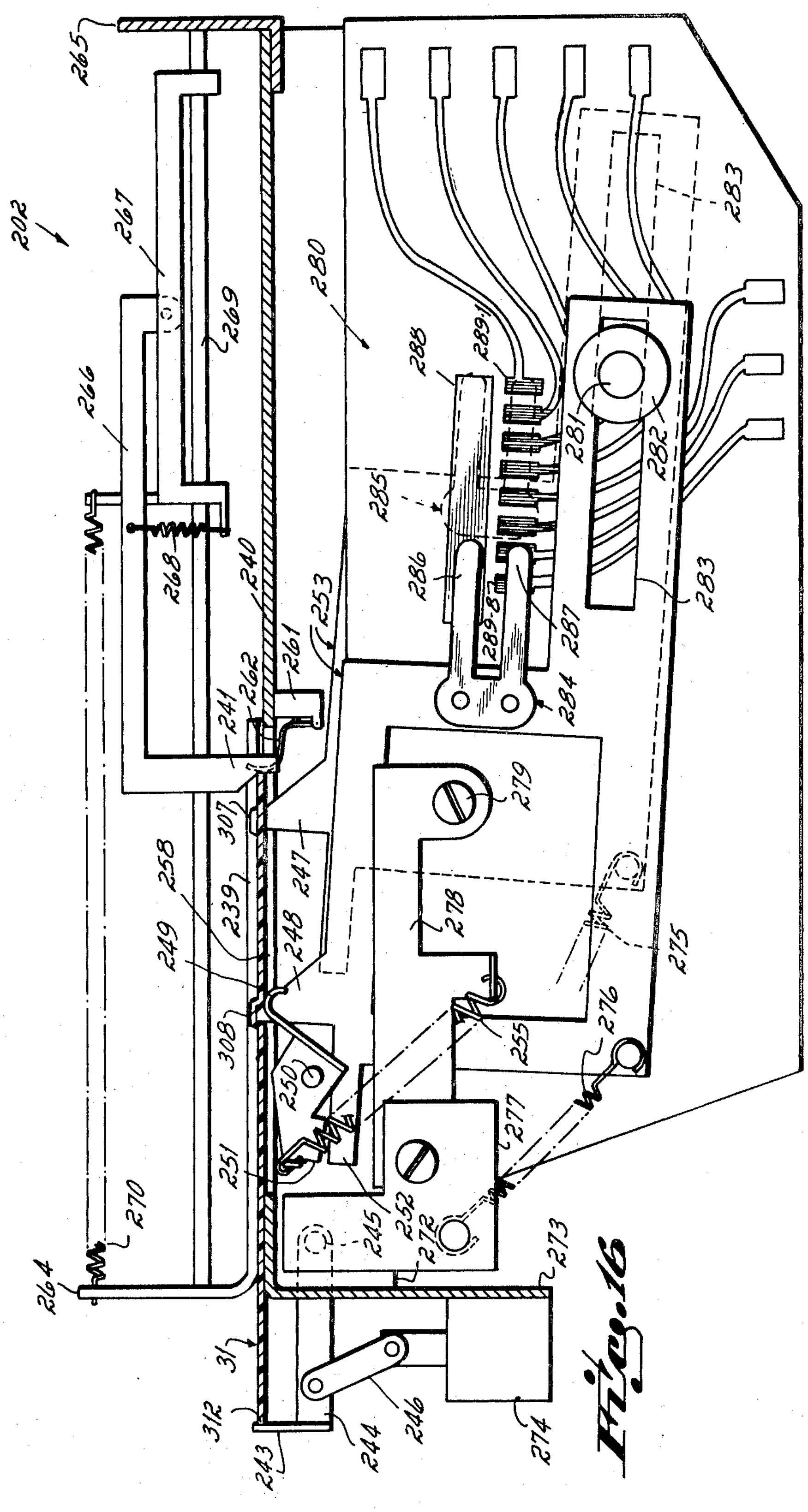
FIG. 16 is a cross-sectional view through the ticket reader of FIG. 12 illustrating in detail the ticket reader decoding mechanism.

14, finger 249 is pivoted about point 250 to raise the abutment surface 251 against the spring 255 to allow the fingers 247 and 248 of the levers 253 to be elevated to ride against the lower surface of the card 31. As the card 31 is further inserted into the slot as shown in FIG. 15, the fingers engage in the respective depressions formed by the bar codes 307 and 308. The section of the card 31 in FIGS. 13 through 15 are taken along the line 305 of the card of FIG. 10. The finger 248 is positioned along the line 305, and the finger 247 is positioned along the line 304 (FIG. 10). Thus, as FIG. 15 shows, the finger 247 will drop into the notch 307 and be deflected to the right in the figure as the card is inserted into the slot 238, and, it will be seen that, if the card were inserted further into the slot, finger 248 would drop into the notch of bar code 308 of the card 31 (FIG. 16). Both the fingers 247 and 248 would be deflected to the right to specific positions when the card 31 is fully inserted to the point where its trailing edge 312 would be retained by the finger 243.

Referring briefly to FIG. 17, the relative arrangements of the components discussed thus far will be seen. The lower guide plate 240 has an opening 258 therein through which the feed fingers 247 and 248 may contact the card. Also, the card detecting fingers 249 project through this opening 258. The plate 240 is rigidly mounted by a pair of brackets 259 to the panel 227 of the unit 200. The upper guideways 239 are Z-shaped in cross section and are secured to the plate 240 to guide and retain the card and thus the scan lines 304, 305 in their proper positions in the slot 238. A limit switch 261 is provided which has an actuator 262 projecting into the slot 258 to detect the position of the card when it is fully inserted within the slot 238. Another limit switch 262 is provided beneath the plate 233 to verify that the card 31 has been ejected when the final amount has been paid to thereby insure that the customer has not withdrawn and saved his card for future use upon payment of the amount due. This feature, which will be better understood in connection with the discussion of the electrical and control circuit below, is provided to prevent customers from saving tickets for use on future days where the result would be a reduced fee by using it in place of the proper ticket which may have been issued earlier on the future day.

The mechanical details of the reader and the switch mechanism are illustrated in FIG. 16. The ejector finger 241 is formed of the free end of the lever 266 which is pivotally mounted at one end to a slide bar 267. The lever 266 is spring-biased downwardly by a spring 268 connected in tension between the mid-point of the lever 266 and the slide bar 267. The slide bar 267 is slideably mounted on a pair of guideways 269 which are rigidly attached to upstanding brackets 264, 265 fixed to the plate 240. The slide bar 267 is spring-biased toward the bracket 264 by a spring 270 connected in tension between the bracket and an extension of the slide bar 267.

Figure 18:
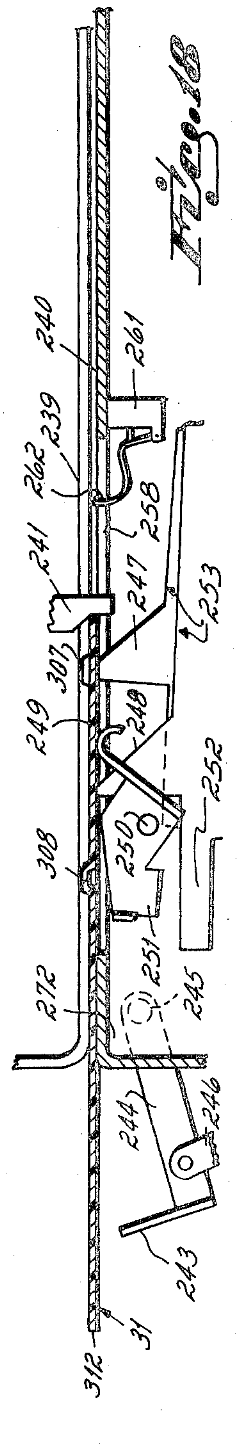
FIG. 18 is a view similar to FIGS. 13–15 illustrating a card being ejected from the reader.

Fixed side panels 272 of the plate 240 are provided for the pivot point 245 which secures the latch 243 and lever 244. The card eject link 246 is actuated downwardly to eject the card by a solenoid 274 attached to a panel 273 of the plate 240. The finger 243 is biased upwardly by the spring of the solenoid 274. The ejecting of the ticket 31 upon the lowering of the finger 243 is illustrated in FIG. 18.

The read finger levers 253 which carry the read fingers 247 and 248 are spring biased upwardly by the springs 275 and 276, respectively, which are attached in tension between the members 253 and a lever guide plate bracket 277. The bracket 277 is fixedly secured to and connected between the side panels 272. Fixed to this bracket is a pair of lever guide plates 278 which retain the levers 253 in contact with a circuit board 280. Connected to the plates 278 is the spring 255 which biases the card detecting finger 249.

Secured to the bracket 277 and guide plate 278 by screws 279 is the double-clad printed circuit board 280 which carries the contacts of the switching circuit. A pivot pin 281 is mounted through the board 280 and has a pair of retaining washers 282 at each end. The finger levers 253 have a slot 283 therein through which the pin 281 extends to mount the levers 253, both pivotally and slideably, to the printed circuit board 280. U-shaped spring clips 284, 285 are fixed to the levers 253 and each has a pair of contacts 286 and 287 adapted to ride on the surface of the printed circuit board and to complete a circuit between an etched strip 288 and a different one of a set of separate etched contacts 289–1 through 289–8 on the PC board 280. When a valid code is presented on a card inserted in the reader 202, the circuit is completed through both of the sets of contacts as will be seen in connection with FIG. 19 below. If no valid code is presented, that is if neither of the switches is actuated to the last position, position 289–1, then no circuit is completed.

Referring to the switch circuit diagram of FIG. 19, the power input terminal 295 is connected to each of the first contacts 289–1, 291–1 of the series 289 and 291 respectively. If either of the contacts 284 or 285 is in contact with this first position, then a valid numerical character is recognized by the energizing of the strips 288 and 290. In the example shown in the figures, the finger 247 in engagement with the bar code 307 causes the contacts 285 to connect the strip 290 to the contact 289–1 and to simultaneously apply the voltage from the contact 295 to both of the strips 290 and 288 which are connected together by the conductor 296. Similarly, the finger 248 which has engaged the bar code 308 causes the contact 284 to connect the contact 291–7 to the strip 288 and thereby to apply this energizing potential to the output line 297–12 of a set of output lines 297–1 through 297–12. The energizing of line 297–12 represents a number 12 and represents a card which has been dispensed from a compartment 102–12 of the magazine 101 of the dispenser 100.

DESCRIPTION OF PAY STATION CONTROLS

Figure 20:
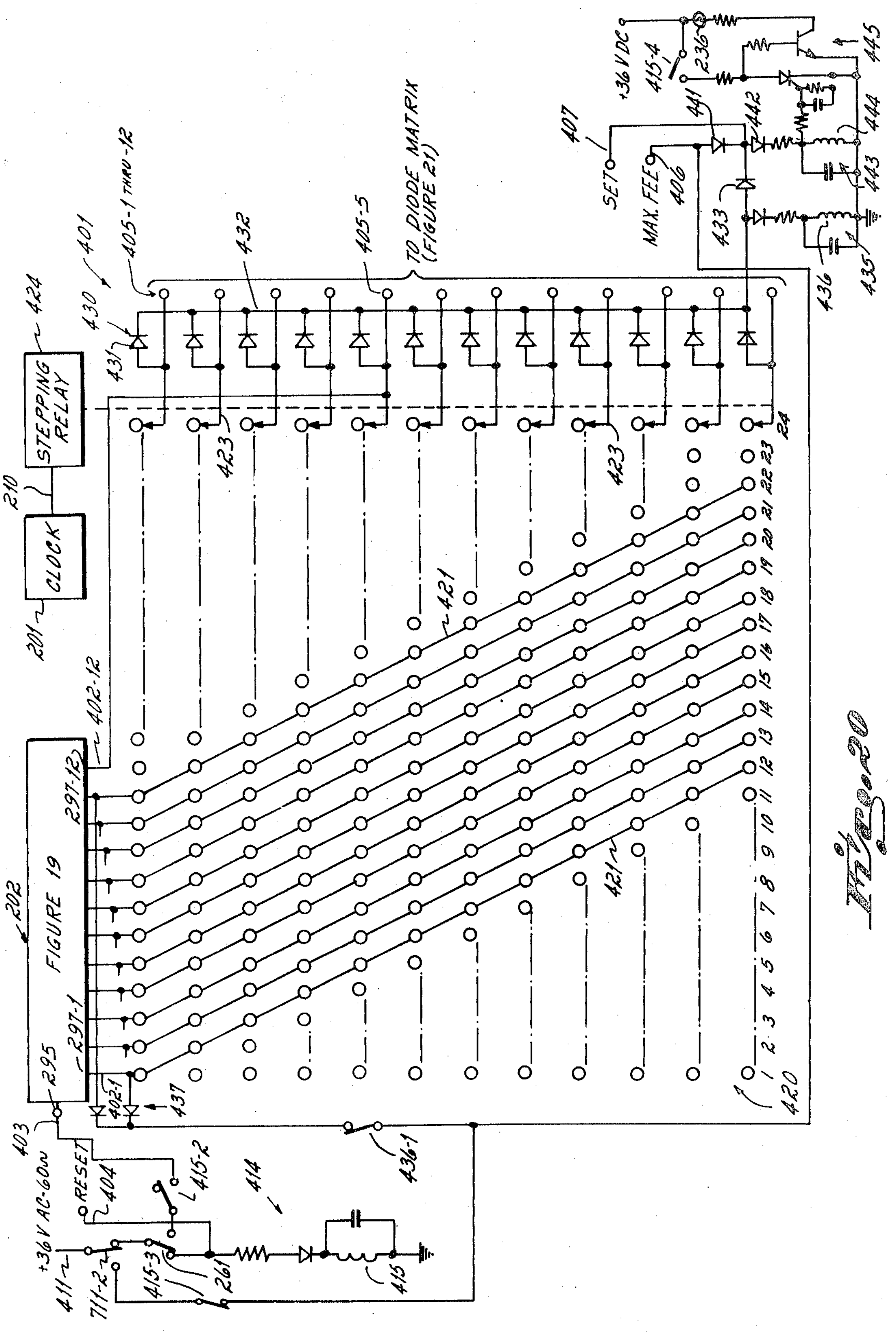
FIG. 20 is a schematic diagram of the elapsed time computing circuit of the logic circuit of FIG. 9.
Figure 21:
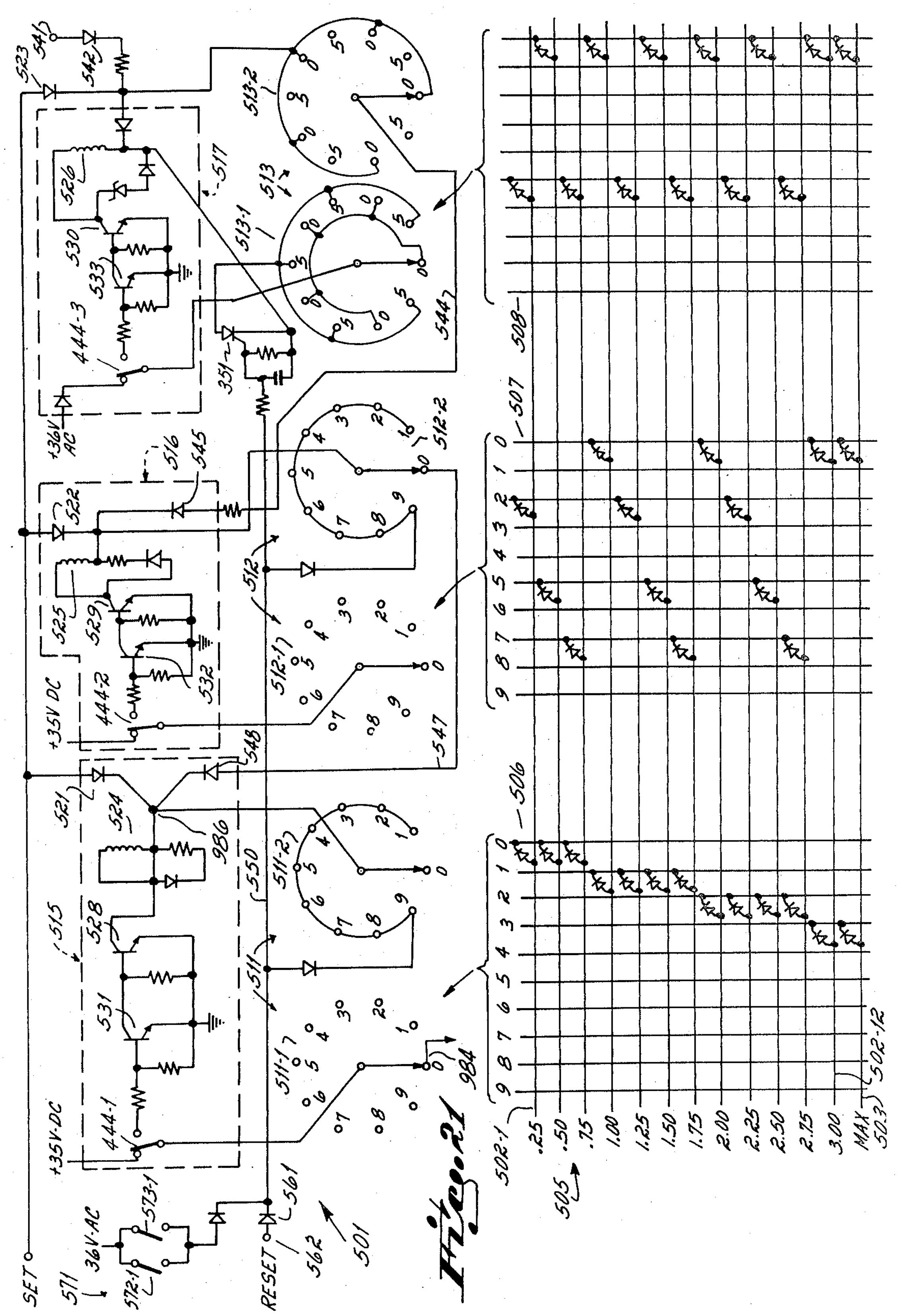
FIG. 21 is a schematic diagram of the fee computing circuit of the logic circuit shown in FIG. 9.

As pointed out in connection with the discussion of FIG. 1, the pay station includes a time and amount due computer 203, a display device 204, a cash receiving and crediting device 205, and an output control device 206. Generally, the electrical components associated with the computation module 203 are illustrated in FIGS. 20 and 21. FIG. 20 illustrates the elapsed time computing circuitry, while FIG. 21 illustrates the fee computation circuitry and the associated circuitry for the display module 204. The output control circuitry 206 is illustrated generally in FIGS. 22 and 23, while the cash receiving and control circuitry is illustrated partially in FIGS. 22, 24, and 25. The power supply and wiring associated with the programmer 201 is illustrated in FIG. 26. The interrelation of these circuits will be better understood in connection with the logic and operational discussion outlined in subsequent figures.

Referring to FIG. 20, an elapsed time computing circuit 401 is illustrated. This circuit computes the time period upon which the fee is to be based, and also provides additional means for selecting alternative bases for computing the fee, such as the maximum fee limit, a flat night rate, a lost card maximum fee, etc. The circuit 401 includes a plurality of inputs 402, twelve in number, which connect to the outputs 297–1 through 297–12 of the card reader switching circuit 202 (FIG. 19). The circuit 401 also includes a terminal 403 which is connected to the input of the card reader switch 295, and is provided with a reset output 404 which resets the display and storage circuits 204 to zero. A plurality of fee basis setting outputs are provided. These include a set of twelve time interval outputs 405 and a maximum fee output 406, all connectable to the fee computation circuit (FIG. 21). The circuit 401 is also provided with a fee set control output 407 which controls the actual setting of the fee in the storage counters 204 in accordance with the signals at the outputs 405 and 406.

The circuit 401 is provided with a 36 volt 60 hz input 411 which is connected through a contact 711–2 of a lost card maximum fee control relay 711 (FIG. 22), through its normally closed contact to the common terminal of the card-in limit switch 261 (FIG. 17) of the card reader 202. The normally closed contact of this limit switch is connected through a relay winding energizing circuit 414 to ground. The circuit includes the winding of a relay 415 which, in the normal stand-by position illustrated, is normally in the energized condition. The relay energizing circuit 414 is designed to provide this relay with an approximately 300 millisecond delayed drop-out. The normally opened contact of the card in limit switch 261 is connected through the normally closed contacts 415–2 of the relay 415 (which are illustrated as open) because the relay 415 is normally energized, and to the output 403 which, as stated above, connects through the card reader 202 which in turn closes the circuit between the output 403 and a selected one of the inputs 402, provided a valid card has been read by the reader 202.

These inputs 402 are connected to different sets of contacts on a twelve deck, 24 position stepping switch 420. The first eleven of the contacts 402 are connected each to one of the contacts on each of the decks of the switch 420 in progressively increasing positions on each of the decks. These connections are illustrated by the diagonal conductors 421 in FIG. 20. The twelfth input, 402–12, is connected directly to the output 405–5 and is representative of the last time period of the day for which a flat night rate is to apply. The wipers 423 of each of the decks of the stepping switch 420 are each connected to one of the outputs 405. Because only one of the inputs 402 can be energized by the switch 202 at any one time, then not more than one of the outputs 405 can be energized at one time, that one being determined by the position of the stepper switch contacts 423. With the contacts in the position shown, none of the outputs 405 is energized, since no wiper contacts a conductor 421. This condition is representative of a "top-out" condition, in which every motorist entering prior to the night rate period will be assessed the maximum fee. This condition will occur whenever the one energized conductor 421 is contacted by no wiper 423.

The wipers 423 are advanced from left to right in FIG. 20 by a stepper relay 424 in response to pulses from the block 201 along the clock output line 210. The stepper relay automatically recycles from the 24th to the first position upon completion of the sweep from left to right.

Each of the wiper contacts 423 is connected through the input of an OR-gate 430 which consists of the set of diodes 431 commonly joined at their anodes to a bus line 432. The bus line 432 is connected through a diode 433 to the set output 407. When one of the circuits through the stepping switch 420 is completed, a 60 cycle half sine wave output will appear at the output 407. Similarly, the bus line 432 is connected through a diode to a relay energizing circuit 435 which includes the winding of a relay 436. The relay 436 provides a "top-out" fee control, a condition represented when the relay 436 is not energized. The relay 436 will be energized by the appearance of a signal on any of the output lines 423 if a contact has been made with any of the lines 421 of the stepping switch 420. A set of relay contacts, set 436–1, which is connected to the output of an OR-gate 437 having diode inputs connected from all but the night rate input of the inputs 402. If the relay 436 is not energized, the maximum output 406 will be energized to indicate that the maximum "top-out" fee is applicable. Also connected directly to the maximum fee output 406 is the normally opened contact of the lost card relay contact 412–2, connected through the normally opened contact 415–3 of the normally energized relay 415.

The maximum fee output 406 is connected through a diode 441 to the set output 407 so that pulses will be simultaneously generated on both output lines when the maximum fee applies. A set output is in turn connected through a diode 442 to a relay energizing circuit 443 which includes the winding of a relay 444. The relay 444 is the fee setting control relay which has connected across it the card in backwards indicator light driving circuit 445 which operates the card in backwards indicator light 236. This card in backwards indicator light 236 will be lit whenever a card is inserted which does not result in an output of the set output 407. This condition is monitored through a relay contact 415–4 of the normally energized relay 415.

The fee computation circuit 501 of the computing module 203 is illustrated in FIG. 21. This circuit includes twelve inputs 502–1 through 502–12 which connect directly to the outputs 405 of the time computing circuit 401. An input 503 is provided which connects directly to the maximum fee output 406 of circuit 401. The inputs 502 and 503 are connected through a diode matrix 505 which converts the input signal from a single one of the lines 502 or 503 to a three-digit digital output on the lines 506, 507 and 508. The matrix 505, as illustrated, is set up for computing fees based on a rate scale of 25 cents per hour with a maximum fee of three dollars for a day. It will be seen that, in the embodiment illustrated in FIG. 21, the fee scale may be set up on any basis which utilizes fees which are an even multiple of five cents.

The digital outputs from the lines 506–508 are stored for display and future computation on three two deck, ten position rotary switches 511–513, respectively. The display 204 is driven by outputs (not shown) from these switches 511–513. The circuits of the switches 511–513 connect the switches in a decrementing counter type circuit in which the switches are set in an initial digital number representative of the fee due as generated by the diode matrix 505. The decrementing counter circuits also operate to recompute the balance due as cash is inserted into the pay station 200 by subtracting the amount deposited from the amount displayed on the switches.

The hunt circuit function which sets the counters 511–513 to their initial values is provided by the circuits 515–517 respectively. When the set relay 444 (FIG. 20) is energized, the contacts 444–1 through 444–3 will energize. Simultaneously, the pulses from the set output 407 of the circuit 401, which output is connected to the set input 520 of the circuit 501, proceed through the diodes 521 through 523 of the circuits 515–517 respectively and through the coils 524–526 of the switches 511–513 respectively, and through the transistors 528–530 respectively to ground. This causes the counters 511 through 513 to be pulsed and stepped in a clockwise direction through the application of the 60 cycle half wave rectified signal on the set input 520. The energizing of the relay contacts 444–1 through 444–3 connects the wipers of the first decks 511–1 through 513–1 of the switches 511 through 513 to the base circuits of the transistors 528 through 530 respectively. These base circuits include transistors 531 through 533 which have their bases connected to the normally opened contact of the relay contact sets 444–1 through 444–3, and their collector emitter paths connected across the base emitter paths of the transistors 528 through 530. When any one of the switches 511–513 is in a position in which its wiper contact is connected to an energized one of the inputs 506–508, then the respective transistor 531–533 is energized to render the associated transistor 528 through 530 non-conductive. This condition breaks the circuit from the set input 520 through the respective counter coil 524–526 and causes the stepping of the switches 511–513 to stop when the switch has achieved the position which displays the amount due as presented on the outputs 506–508 of the diode matrix 505. By inspection of FIG. 20, it will be seen that the set signal input at input 520 to the circuit 501 is of limited duration and is controlled by the delayed drop-out of 300 milliseconds of the relay 415. During this time delay, sufficient pulses have been transmitted through the set input 520 to insure that all of the switches 511–513 have been stepped enough times to advance them to their proper positions to display or store the amount due.

It will be seen that the switch 513 has logically only two positions, a zero position and a five position.

When the counters 511–513 have stored the amount due, the counters may be decremented to subtract any amount paid from the amount or balance due stored in the counters 511–513. The signals which cause this subtracting function are applied through a subtract input 541 which is connected through a diode 542 in series with the coil 526 of the counter 513. Each of the pulses at the input 541 represents a payment in the amount of five cents toward the balance due. As will be explained below, all coins deposited into the cash receiver 205 will be converted into a number of pulses representative of their nickle equivalent. (As a practical manner, currency deposited will operate directly in the reduction of the amounts stored in the dollar digit column on the counter 511.) Each five cent pulse entering the input 541 causes the counter 513 to rotate one position. Each time a zero position is engaged, a transfer digit signal is transmitted along the line 544 which connects between the wiper of the second deck 513–2 of the switch 513 and an input diode 545 which is the equivalent in the circuit 516 of the diode 542 in the circuit 517. This causes the five cent pulse from the input 541 to be transmitted through the switch deck 513–1 and the line 544 to energize the winding 525 associated with the switch 512 to decrement the switch 512 by one digit. Similarly, when the counter 512 is in a zero position, this condition is monitored through the switch deck 512–2 which has its zero contact connected through a line 547 and through an input diode 548 which is circuit 515's equivalent of the diodes 545 and 542. This causes the five cent pulse which has been transmitted through the diode 545 of circuit 516 to further pass through the wiper contact of the deck 512–2 and the line 547 and the diode 548 to energize the relay 524 and decrement the counter 511 by one digit. When the total amount has been paid, the zero conditions of the switches 511–513 are detected by the circuit which will be described in connection with FIG. 23 below.

Circuitry is also provided to reset the counters 511–513 to their zero positions without depositing money. This reset circuit includes a reset line 550 which connects through a diode 561 to a reset input 562 which is connected from the reset output 404 of the circuit 401. The reset line 550 is connected to the non-zero switch positions of the second decks 511–2 and 512–2 of the switches 511–512, and the gating circuit of an SCR 351 connected between the "five" contacts of the first deck 513–1 of switch 513 in series with the coil 526 of the counter 513. In this manner, the half wave rectified pulses which are output from the output 404 of the circuit 401 operate to advance the switches 511–513 to zero in exactly the same manner that the switches 511–513 were set to a non-zero position. The pulses on the reset input 562 are present whenever a card is absent from the card reader as indicated by the switch 261 of FIG. 20.

Figures 22, 23:
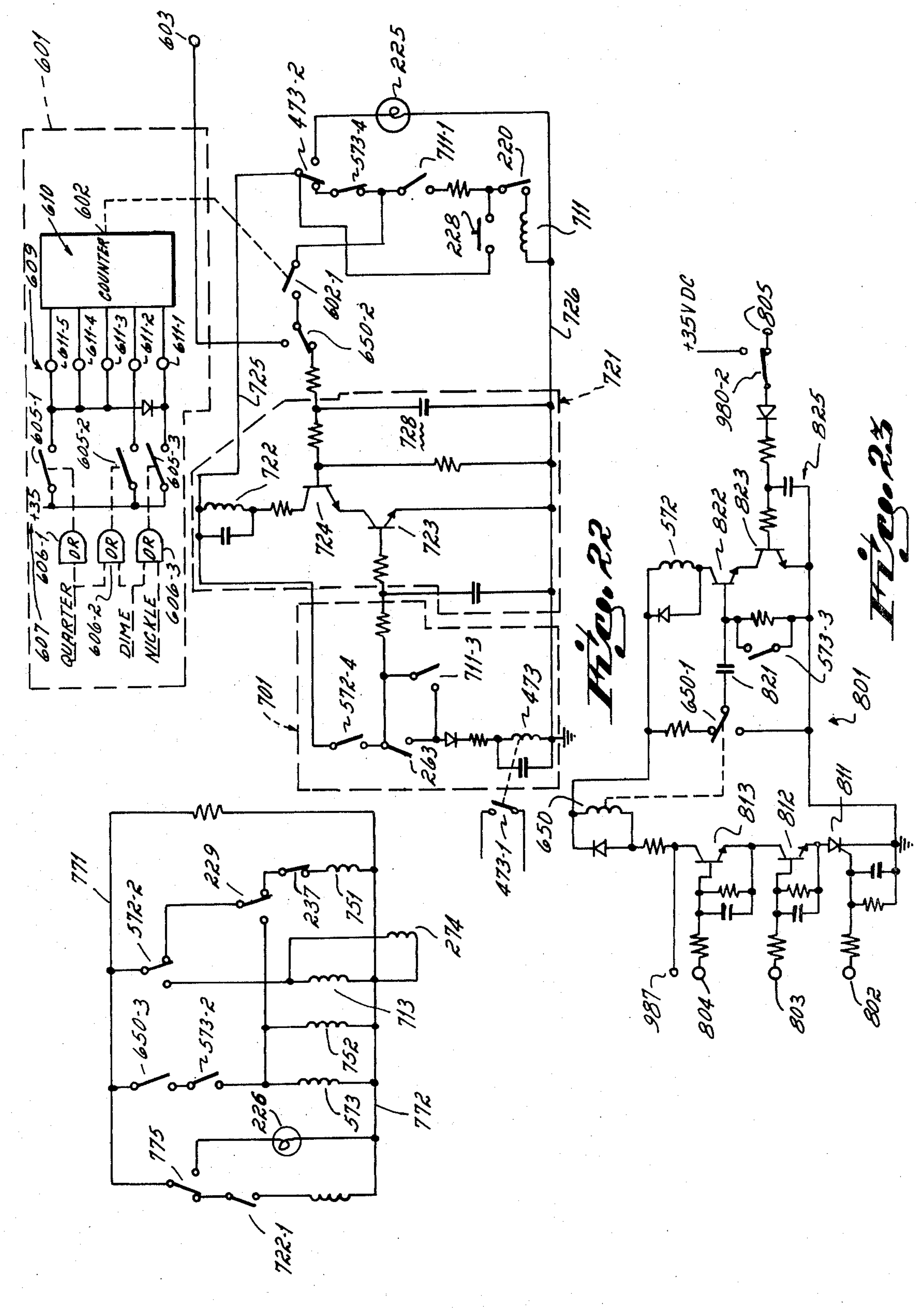
FIGS. 22 through 26 are schematic diagrams of the logic computer and control circuit from the block diagram of FIG. 9.

Other conditions which operate to reset the counters 511–513 to a zero indication are applied through the circuit 571. This circuit includes a pair of parallel connected relay contacts including contacts 572–1 of a relay 572 (FIG. 23) and contacts 573–1 of a relay 573 (FIG. 22). These relays operate to clear the counter at the occurence of each "vend" condition, that is whenever a transaction has been completed which results in a customer being permitted to leave the parking area, as represented by the new relay 572, and by a "cancel sale" condition which results when a customer has changed his mind during the course of a transaction by depressing the cancel sale push button on the panel of the pay station.

Figure 24:
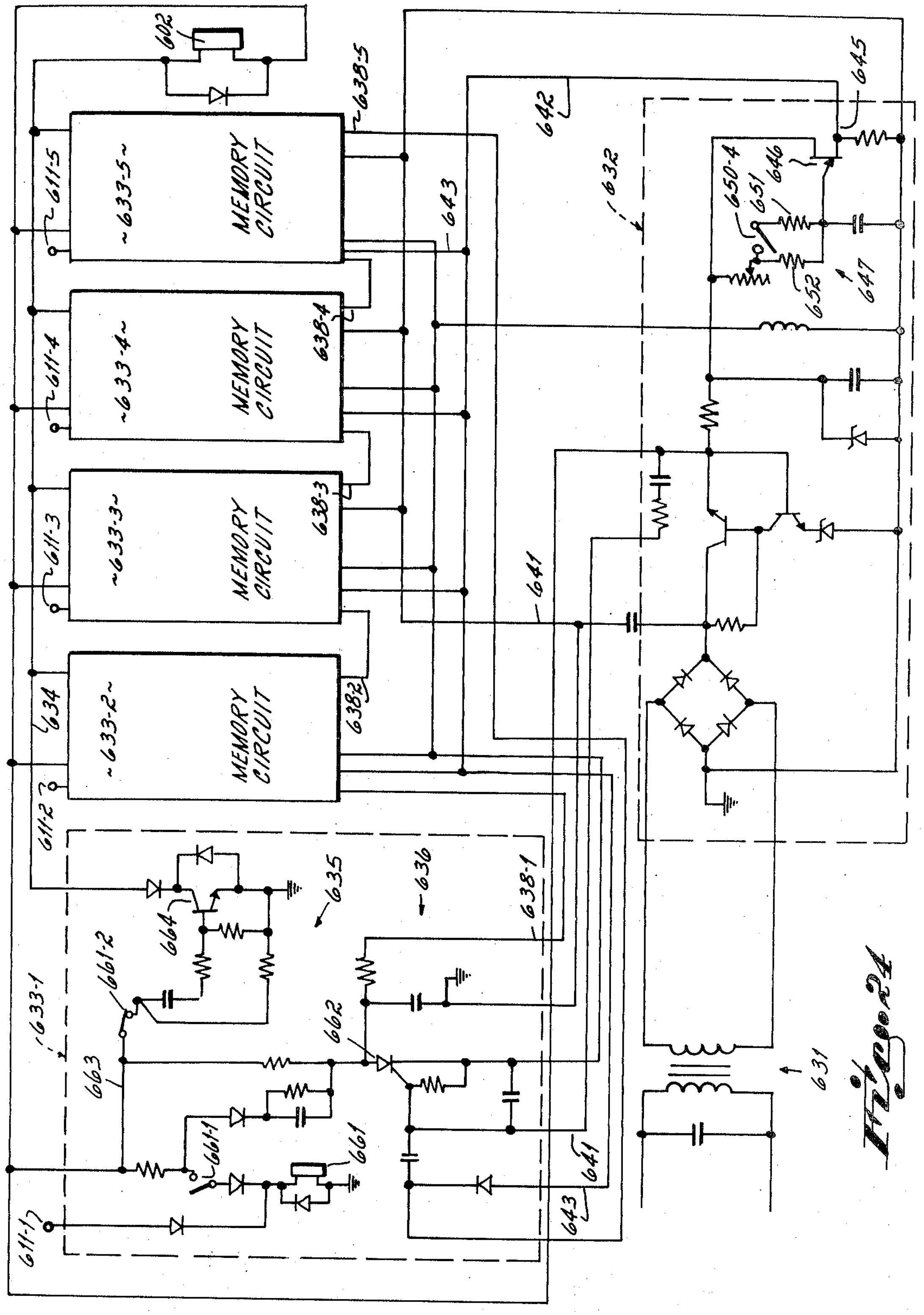

Referring now to FIG. 22, the coin counting circuit 601 is illustrated. This circuit generates the five cent equivalent pulses by closing contacts of a relay 602 (FIG. 24). These pulses are converted to electrical signals through a circuit which includes the contacts 602–1 of the relay 602 to apply the pulse signals to the output terminal 603 which is connected to the input 541 of the circuit 501 (FIG. 21). The circuit 601 includes three limit switches 605–1, 605–2, and 605–3, which are physically contained within the coin accumulator mechanism 221. These switches are physically positioned so that they will be tripped in different combinations depending on whether quarters, nickles, or dimes are deposited into the coin accumulator slot 211 (FIG. 3A). As is symbolically shown by the OR-gates 606–1 through 606–3, the depositing of a quarter results in a momentary closure of the switches 605–1 and 605–2. Similarly, the depositing of a dime results in a closure of the switches 605–2 and 605–3, while the depositing of a nickle results only in the closure of switch 605–3. These switches are connected each between a 35 volt DC source 607 and an input circuit 609 of a parallel to sequential pulse converter circuit 610. The circuit 610 converts simultaneous pulses appearing at its input terminals 611–1 through 611–5 into a pulse train having a number of sequential pulses equal to the number of parallel pulses at the different inputs 611. Specifically, the depositing of a quarter results in a pulse being applied to each of the five inputs 611, the input 611–2 being energized by the switch 605–2 and the inputs 611–1 and 611–3 through 611–5 being energized by closure of the switch 605–1. Similarly, the depositing of a dime closes the switches 605–2 and 605–3 to energize the inputs 611–2 and 611–1 respectively. The depositing of a nickle energizes only the terminals 611–1 through the closing of the switch 605–3. The operation and details of the circuit 610 are illustrated in FIG. 24.

Referring briefly to FIG. 24, the circuit 610 includes a power supply 631, a free-running oscillator circuit 632, and five identical memory channel circuits 633–1 through 633–5. Each of the memory channel circuits 633 includes one of the input terminals 611, an output terminal 634, a pulse storage circuit 635 which stores a pulse input at the input terminal 611 until the circuit is triggered in such a manner as to cause it to transmit this pulse ot its output 634, and a gating circuit 636. The gating circuits 636 of each of the circuits 633 are connected through the lines 638–1 through 638–5 in a circular shift register form. One of the circuits 636, and only one, is energized at any instant of time. When power is first applied, the first of these circuits, 636–1, is energized through a start circuit 641 by a signal from the oscillator 632. Shift pulses generated at an ouput 642 of the oscillator 632 are simultaneously sent to trigger inputs 643 of each of these circuits 636. The shift pulses cause the energized one of the circuits 636 to de-energize, and the next consecutive circuits 636 to energize by the transfer of a signal along the line 638.

The oscillator circuit 632 is a conventional unijunction relaxation oscillator circuit which operates in a free running mode to generate a series of pulses at its output 642 from the base-one terminal 645 of its unijunction transistor 646. The frequency of these pulses is determined by the RC circuit 647. The values of the resistor and capacitor components of the circuit are selected to provide pulse frequency outputs which can be selected at two levels, one at six pulses per second and a second at 35 pulses per second. The selection is achieved by the position of the relay contacts 650–4 of a relay 650 (FIG. 23). When the contacts 650–4 are closed, the frequency is at six pulses per second, which frequency is used to operate a change return mechanism as will be pointed out below. In this position, a resistor 651 is shunted across a second resistor 652 to provide the lower frequency operation of the oscillator 632. When the contacts 650–4 are opened, the resistor 651 is out of the circuit, and the oscillator 632 will free run at the higher frequency of 35 pulses per second which establishes the rate at which the series of pulses will be emitted from the circuit 610 at its output relay 602.

The output consists of a reed relay 602 which has one terminal of its winding connected to all of the outputs 634 of the circuit 633 and the other terminal connected to a +24 volt DC supply.

The storage circuits 635 each includes a pulse storage relay 661 which is energized by the application of a pulse to the input 611. When the relay 661 energizes, it latches itself through its contact 661–1 to store the pulse, and the normally closed contacts 661–2 open. When the associated shift register circuit position 636 of the circuit 633 is energized, an SCR 662 becomes conductive, causing a momentary ground to be applied on line 663, which causes the relay 661 to drop out. This causes the normally closed contact 661–2 which opened when the relay 661 energized, to remake, generating a positive pulse, which causes a transistor 664 to momentarily conduct, grounding the output 634 and momentarily energizing the output relay 602. In a similar manner, as the shift register circuit 636 operates to scan the circuit 635, all of the pulses will be sequentially generated at the relay 602.

Referring to FIG. 23, the circuit illustrated operates in conjunction with the circuit 701 of FIG. 22 to perform an AND-gate function which permits a vending operation to occur only when the counters 511–513 simultaneously approach a zero reading as the result of cash being deposited into the cash receiver. This function is performed in the coincidence circuit 801 of FIG. 23 which samples the zero positions of the counters 511–513 at its inputs 804, 802, and 803 respectively to energize the relay 650. The energizing of the relay 650 is logically AND-ed with the counter decrementing pulses at another gate input 805. The input 805 is connected to the output 603 of the circuit 601 of FIG. 22. The inputs 802–804 are connected to the zero position contacts of the first decks 311–1 through 313–1 of the counter switches 311–313.

The circuit 801 includes a series circuit consisting of an SCR 811, a transistor 812, transistor 813, and the winding of the relay 650. The gate of SCR 811 is connected through a circuit to the input 802 of the circuit 801, and the bases of transistors 812 and 813 are similarly connected through circuits to the inputs 803 and 804 respectively. The inputs 802–804 will be energized when the switches 511–513 read zero, and in this condition the devices 811–813 will be conductive in a manner which will energize the relay 650. The energizing of the relay 650 causes its set of contacts 650–1 to assume a position indicated in the figure. Upon the energizing of the relay 650, a pulse is generated to the capacitor 821 and applied to the base of a transistor 822. This transistor is connected in series with the winding of the relay 572 and a transistor 823 between a +35 volt DC line and ground. The input 805 which carries the counting pulse signals is connected through a storage circuit 825 to the base of the transistor 823. After each pulse at the input 805, the transistor 823 will be rendered conductive for a short period of time thereafter. If, during this time, the relay 650 energizes, the pulse transmitted through capacitor 821 to the base of transistor 822 will cause a current to flow which will energize the relay 572 which constitutes the vend control signal discussed in connection with FIG. 22. The output of the second AND function is the energizing of the relay 572. This output is again logically AND-ed in the circuit 701 to FIG. 22.

Referring again to FIG. 22, the output circuits which perform the function of block 206 of FIG. 12 are illustrated. The ultimate output function of the pay station (at least in connection with the FIG. 3A embodiment herein described) lies in the raising of the gate 14 to allow the motorist access to the exit ramp 13 once he has paid the amount due for the time he has parked. This function is ultimately obtained through the closing of the relay contacts 473–1 which energize the gate raising circuit. The output circuits, however, provide additional functions primarily in the form of safeguards which prevent motorists from cheating the system by causing the gate to be raised without the depositing of the total amount due while simultaneously returning a portion of the customer's money to him. Further circuitry is provided which insures that the gate will be raised once the parking fee has been paid.

Toward these ends, the relay 473 is connected in series with the normally opened relay contacts 572–4 of the relay 572 (FIG. 23), and a parallel circuit consisting of the normally opened contacts 711–3 of the lost card relay 711 and the normally opened contacts 263A of the card drop switch 263. The drop card solenoid 274 is connected in parallel across the winding of a coin drop relay 713. This parallel winding circuit is connected in series with the normally opened contacts 572–2 of the vend control relay 572 (FIG. 23) across 120 volt AC power leads 771 and 772. Thus, the raising of the gate by the actuation of relay 473 can only occur when both the coin drop solenoid 713 and the card drop solenoid 274 ar energized, and the card has actually been retained by the pay station as verified by the card drop switch 263 (FIG. 17). Alternatively, in lieu of the actual detection of the dropping of a card by switch 263, vending may occur provided the lost card relay 711–3 has been energized.

A change refunding circuit 721 is provided which includes a relay 722 which is included in the coin accumulator mechanism 221 and operates in response to a series of pulses which count out the number of nickles to be returned to the customer in change. The winding of the solenoid 722 is connected in series with a pair of transistors 723 and 724 across the DC power leads 725 and 726. The base of the transistor 723 is connected to the vending circuit 701 so that change can only be returned when a vend control signal is executed, thereby preventing customers from exhausting the change of the pay station without actually paying for parking privileges. The transistor 724 has a base connected through a time delay circuit 728 to a normally opened contact 650–2 of the relay 650 (FIG. 23). The normally closed contact 650–2 of the relay 650 is connected to the output 603 of the circuit 601. The common terminal of the contact set 650–2 is connected through the normally opened contact 602–1 of the five cent pulse generator relay 602 (FIG. 24), which is connected through the normally closed of the contacts of the set of contacts 573–4 of the relay 573 and through the normally closed position of the contacts 473–2 of the vend relay 473 to the positive DC line 725. By this circuit, prior to vend, a signal in the form of a series of pulses is generated by the closing of the relay contact 602–1 and the series of pulses is communicated to the normally closed contact of the set 650–2 to the output 603 of circuit 601 to apply counting pulses to the input 541 of the circuit 601 of FIG. 21. By reference to FIG. 24, it will be noted that the frequency of these pulses is at 35 pulses per second during this time period. At the instant the counters 511–513 (FIG. 21) read zero, the relay contact 650–2 will switch as will be explained in connection with the discussion of FIG. 23 below. At the same time, the contacts 650–4 (FIG. 24) switch to change the pulse rate frequency from 35 pulses per second to 6 pulses per second, and these pulses are applied to the base of the transistor 724 to energize the relay 722 at a low frequency required for the change dispensing mechanism.

The lost card relay 711 is connected in series with a front card switch 220 and the lost card push button switch 228 between DC lines 725 and 726. The relay 711 is provided with latching contacts 711–1 which cause the relay to latch in its ON condition once the push button 228 is depressed. The breaking of the latching state of the relay 711 is achieved by the insertion of a card into the card reader which opens the switch 261 to de-energize the relay 711. The latching contacts 711–1 of the relay 711 are connected in series with the resistor between the junction of the push button 228 and the switch 261 and the junction of the relay contact sets 602–1 and 573–4. A coin return coil 752 is connected in parallel with the winding of the relay 573 to the normally opened contact of the coin return push button switch 229. This normally opened contact is also connected to the normally opened contact of the set of contacts 573–2 which forms a holding contact of the relay 573. The common terminal of the set of contacts 573–2 is connected in series through the normally opened one of the set of contacts 650–3 of the relay 650 to insure that all counters will reset to zero when the coin return button is depressed. The bent coin return solenoid 751 is connected between lines 771 and 772 through the normally closed contacts of the front plate switch 237 and the normally closed contacts 572–2 of the vend relay 572. This circuit prevents the accepting of coins when the customer has his finger in the card slot, and also will return coins in the event of a power failure.

The use correct change indicator light 225 is connected across the parallel lines 771 and 772 through the normally opened contacts of the coin change slot empty switch 775. The normally closed contact of the switch 775 is connected through the normally opened position of the contacts 722–1 of the change refund control relay 722.

Figure 25:
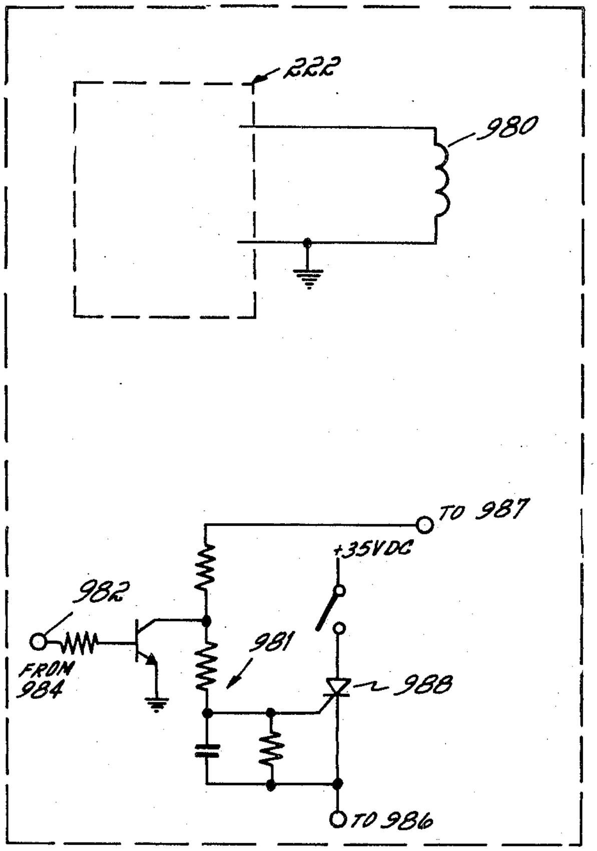
Figure 26:
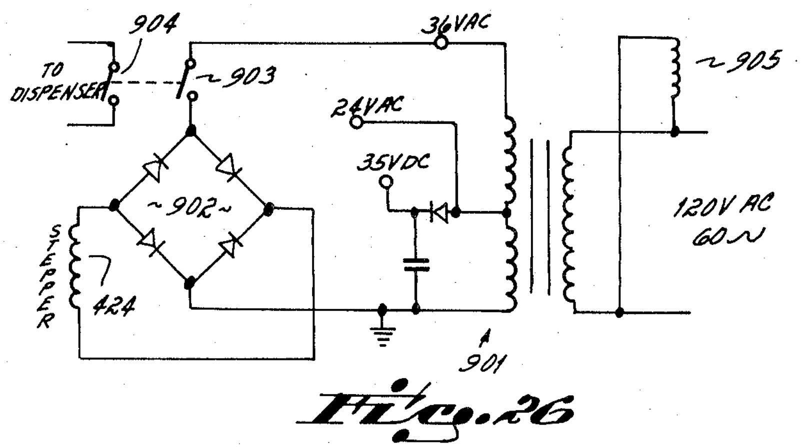
Figure 21:
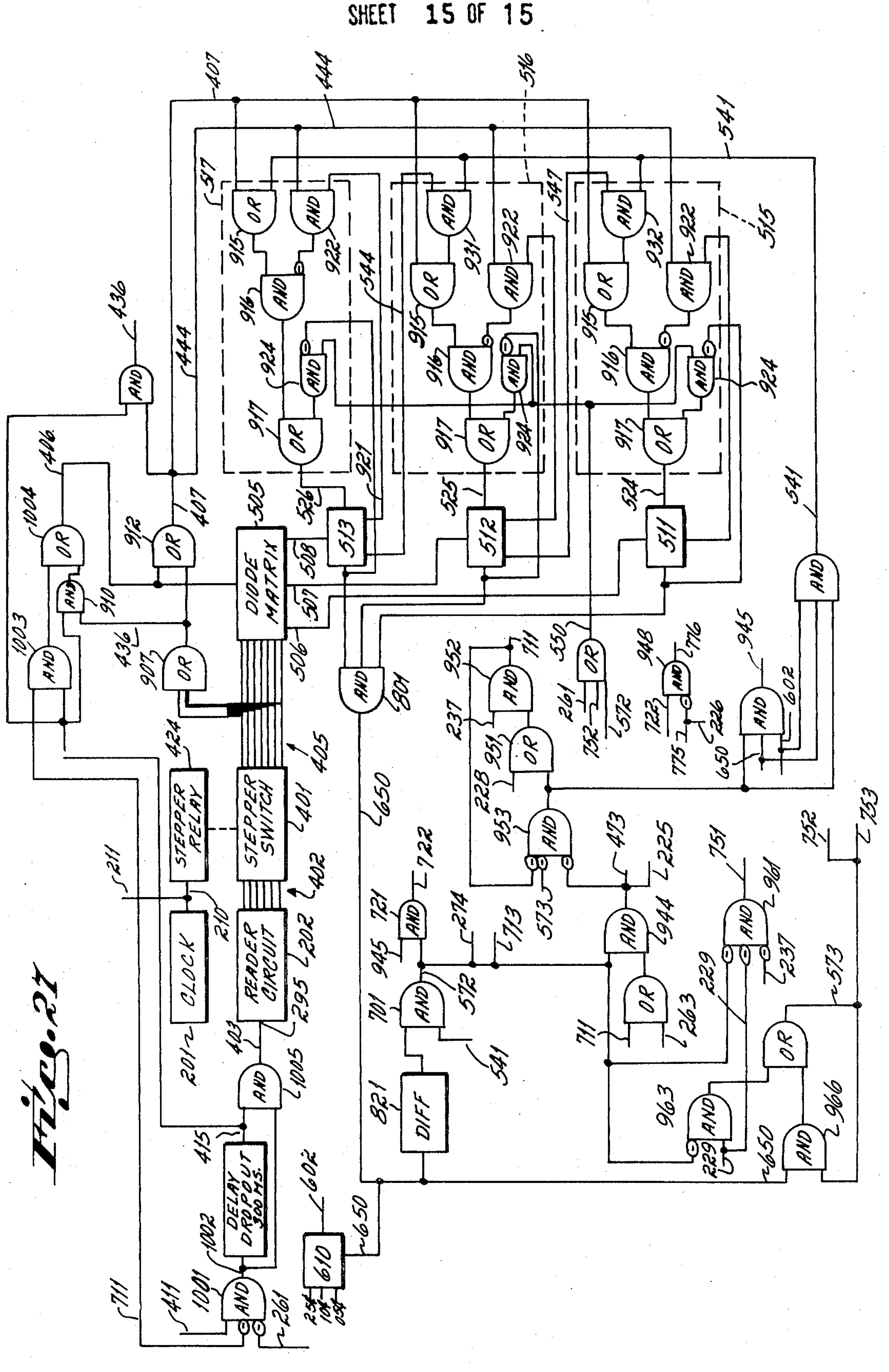

Referring to FIG. 25, the circuitry employed when the bill validator is used with the present system is illustrated. The bill validatory 222 energizes a relay 980 upon receipt of a valid dollar bill. Also provided is an SCR gating circuit 981 having an input 982 which connects to the zero contact of the hundreds switch 511, point 984 (FIG. 21). This circuit 981 gates an SCR 988 connected in series with the contacts 980–1 of relay 980 between plus 35 volt DC and the coil 524 (point 986 of FIG. 21). The gating circuit 982 derives its power from point 987 of the AND-gate of FIG. 23. Also, a contact set 980–2 of the relay 980 is provied at input 805 of FIG. 23 to connect a plus 35 volt pulse to the AND-gate of that circuit to replace the pulse from the coin counter.

Referring to FIG. 26, a power supply is illustrated which is a conventional power supply suitable for generating the power required to operate the circuits described above. In addition to this power supply 901, the stepper relay circuit for the stepper relay 424 (FIG. 20) is illustrated as connected in series with a rectifier 902 and a programmer switch 903 across a 36 volt AC output of the power supply. The programmer switch 903 is momentarily closed by the clock programmer 201 to generate the pulses to the stepper relay 424. The switch 903 is ganged to a switch 904 which constitutes the clock output to the ticket dispenser 100 which causes the indexing of the dispenser magazine 101. The programmer drive includes a synchronous drive mechanism which operates through the winding 905 connected across the 60 cycle 120 volt AC in both leads.

PAY STATION OPERATION

The function and operation of the pay station, including particularly the function of the circuit as set forth in FIGS. 20–26, are snybolically set forth in the logic diagram of FIG. 27.

Referring to FIG. 27, the clock-programmer 201 is illustrated with its pulsed output 211 provided for connection to the dispenser 100 input 103, and its output 210 connected to the input of the stepper relay 424 which maintains the stepper switch 401 in constant synchronization with the time of day. An AND-gate 1001 represents the coincidence of three conditions, (1) that the lost card relay 711 is de-energized, (2) that the back card switch 261 is de-actuated, indicating that no card is present in the card reader, and (3) that an AC signal is present on the line 411. The output 1002 of the AND-gate 1001 is therefore normally in the ON state and the relay 415 is normally energized. When either a card is inserted in the reader or the lost card switch is depressed, the relay 415 will drop out after a 300 millisecond delay. If a card is inserted, and prior to the dropping out of the relay 415, a signal will pass through the AND-gate 1003 and thus through the OR-gate 1004 to energize the maximum fee line 406. If the back card switch 261 is energized, a signal will pass through the AND-gate 1005 as long as the relay 415 is still energized, to the line 403 in the input 295 of the reader switch circuit 202. The card will be read and a signal will be output to the stepper switch inputs lines 402. If information has been read from the card, the signal will be output on one of the stepper switch output lines 405 and will pass through the OR-gate 907 to energize the "top-out" relay 436 which indicates that the maximum fee does not apply. If the relay 436 does not energize, the signal will pass through the AND-gate 910 if the relay 415 is still energized, and through the OR-gate 1004 to signify a maximum fee on the line 406. The maximum fee line 406 and the output of the OR-gate 907 are both connected through an OR-gate 912 to generate a set output signal to the set line 407, and to energize the set in relay 444. If there is no signal on line 407 and the relay 415 is energized, the card in backwards light 236 will be lit.

The signals on the lines 405 from the stepper switch 401 are fed through the diode matrix 505 to generate the coded amount due signals on the lines 506–508, which are input to the counter switches 511–513 respectively. The set pulses on line 407 will pass through the OR-gates 915 of the hunt circuits 515–517 and through the AND-gates 916 and the OR-gates 917 to step the counters 511–513 to the set value. When the switches 511–513 have attained their set value, a coincident signal is fed back along the line 921 which represents the first decks of the switches and into the input of an AND-gate 922 as the set relay 444 is energized, the signal will pass through the AND-gate 922 and disable the AND-gate 916, blocking the pulses from the AND-gate 915 to stop the counters 511–513 to their predetermined positions in accordance with the outputs of the diode matrix 505. Similarly, signals on the reset line 550 will pass through the AND-gates 917 to set the counter to zero and the counters are stopped in their zero positions by signal from the zero switch position of the switches 511–513, which disables the AND-gates 924 to block the reset pulses. The pulses out of the OR-gates 917 represent the energizing of the counter coils 524–526.

Amounts paid are subtracted from the counters 511–513 by the five cent pulses which pass through the line 541 into the OR-gate 915. Since this occurs after the relay 415 has dropped out, there is no signal present on line 407 and the relay 444 is de-energized so that there is no signal present out of the output of the AND-gate 922 to disable the AND-gate 916. Thus, the signal pulses from the line 541 pass through the OR-gate 915, the AND-gate 916, the OR-gate 917 to energize the coil 526 and decrement the switch 513. This pulse 541 passes only directly into the circuit 517. The pulse is allowed to pass through the other circuits 515 and 516 only as a transfer bit is generated along the transfer lines 544 and 547 respectively to enable the AND-gates 931 and 932 respectively.

The five cent pulses on the line 541 are generated by the circuit 610 as explained in detail above. The frequency of the pulses output from the circuit 610 are controlled by the counter zero relay 650 which is energized by the AND-gate 801 which generates an output signal when the counters 511–513 are all in their zero positions. The output of the circuit 610 is the pulser relay 602.

The ultimate operation of the control circuit include, most importantly, the opening of the gate represented by the operation of the gate solenoid 473, which also causes the light of the fee paid light 225 on the panel, the coin drop operation represented by the actuation of the coin drop solenoid 713 which drops the money deposited by the customer irretrievably into a cash box within the unit, the coin return operation in which this cash is alternatively returned to the customer in the vent his sale is cancelled as represented by the actuation of the coin return solenoid 752, and an additional coin return solenoid 751 which, when de-actuated, allows the coins to pass directly through the unit without being counted and returned to the customer. This solenoid is de-actuated if the power of the system were to fail or the system were otherwise inoperative, and finally the change refund solenoid 776 which returns nickles one at a time to the customer as change. Tracing the operation through the system, when all of the counters have reached zero a zero signal passes through the AND-gate representing circuit 801 to actuate the zero signal solenoid 650, which signal is differentiated by the capacitor circuit 821 and then AND-ed again with the cash pulses from line 541 in the AND-gate circuit 701 to energize the vend relay 572. This signal is AND-ed again in AND-gate 944 with either the card drop signal 263 or the lost card relay output 711 to close the gate relay 473 and actuate the fee paid light 225. The pulse signals 541 occur only when the gate relay 473 is de-energized, the cancel sale relay 573 is also de-energized, and the counter zero relay 650 is de-energized. When the relay 650 is energized, these pulse signals are used to actuate the change return relay through line 945 and the AND-gate circuit 721 where they will energize the change relay 722 only when they occur simultaneously with the vend signal from the vend relay 572. The change signal from the relay 722 passes through an AND-gate 948 to energize the change refund solenoid 776 as long as the change empty switch 775 is de-actuated. The actuation of the switch 775 will also illuminate the change empty light 226 on the panel.

The maximum fee relay 711 becomes energized whenever the lost card push button 228 is pushed, which passes a signal through the OR-gate 951 and the AND-gate 952. This relay latches through an AND-gate 953 as long as the cancel sale relay 573 has not been energized or the gate solenoid 473 has not been energized, both of which relays serve to break the holding circuit and erase the maximum fee 711 from the memory. The front card plate switch 237 also serves to break the holding circuit through the AND-gate 952 to cancel the maximum fee from the memory. The coin return relay 751 is normally energized and holds itself through the AND-gate 961 unless the cancel sale push button 229 is depressed or the front card plate switch 237 is depressed or the vend relay 572 is actuated. When any one of these conditions happens, or if power is to fail, coins which are deposited will be returned to the customer. Depression of the cancel sale push button 229 also generates a signal through an AND-gate 963 as long as the vend relay 572 is de-energized, which causes the total amount paid to be returned to the customer through actuation of the coin return solenoid 573 which will latch and hold itself through the AND-gate 966 unless the counter setting of zero is represented by the energizing of relay 650. This comparison with the zero setting prevents the customer from diverting his money into the cash return slot during the vend operation.

While the present invention has been described in connection with a parking charge computing system, it will be apparent that the invention has far wider use. For example, security systems and premises access systems can also find such use, as well as any application where restricted authorization is required, and particularly wherein it is desirable that the authorized persons have a coded object in their possession for access authorization. Additionally, credit systems of all types may find use for the present invention.

Therefore, what is claimed is:

1. A code reader for reading embossed cards, said cards being encoded with raised impressions projecting from the upper surface thereof and having corresponding depressions on the lower surface thereof, said raised impressions being disposed in first and second longitudinal rows on said cards, the information carried by said cards being correlated with the spacing of said impressions along said rows from an edge of said cards, said code reader comprising:

means for receiving said cards and for guiding said cards longitudinally;

first and second engaging feelers disposed beneath said cards in alignment with said first and second longitudinal rows, said feelers being adapted to engage depressions in the undersurface of said cards;

first spring means urging said feelers toward said cards;

second spring means including a member in abutment with said feelers for normally preventing said feelers from entering the depressions in said cards;

edge sensing means disposed in the path of movement of said cards and shiftable by engagement with a card for disengaging said second spring means from said feelers, whereby said feelers are freed to enter said depressions;

means slidably mounting said feelers for movement parallel to the path of movement of said cards, each of said feelers being shifted longitudinally a distance corresponding to the relative position on the card of the depression engaged by said feeler;

and first and second switches, each switch including a plurality of stationary contacts and a movable contact, said movable contact being carried by said associated feeler.

2. The code reader of claim 1 further comprising means connecting the first and second switches in series, whereby a unique one of said stationary contacts is energized in accordance with the information coded on said card.

3. The code reader of claim 1 in which each of said switches includes an elongated common contact and a row of longitudinally spaced contacts;

and each of said feelers carries two movable contacts one disposed for engagement with said common contact and one disposed for engagement with said row of spaced contacts;

and means interconnecting the common contacts of each switch and a power lead interconnected to one contact of the row of contacts of each switch.

4. The code reader of claim 2 in which said power lead is connected to the contact of each row which is disposed to be engaged by the associated movable contact when it is in its most advanced position.

5. The code reader of claim 1 further comprising:

a panel having a card receiving slot therein;

a spring biased pivotal plate adapted to normally cover said card receiving slot so that a card can be inserted into and withdrawn from said slot when, and only when, said plate is depressed;

a solenoid and a card retainer behind said panel;

an ejector finger adapted to engage the edge of a card inserted in said slot and to be shifted longitudinally along said guide means, spring means urging said ejector finger in a reverse direction;

said retainer being positioned to retain a card in said slot against said spring ejector until said plate is depressed or said solenoid is actuated;

a card storage magazine; and means for actuating said solenoid to disengage said retainer from said card, whereby said card is shifted into said storage magazine by said ejector finger, said card moving in said reverse direction along a path which passes beneath said plate.

6. The reader of claim 5 further comprising:

a card sensor positioned along said path and operative to generate a signal indicating that said card has been irretrievably captured.

* * * * *

UNITED STATES PATENT OFFICE
CERTIFICATE OF CORRECTION

Patent No. 3,816,707 Dated June 11, 1974

Inventor(s) Vernon T. Kleimeyer and Thomas J. Schinner

It is certified that error appears in the above-identified patent and that said Letters Patent are hereby corrected as shown below:

On the title page, the inventor's name should be --Kleimeyer--.

Column 2, line 57 "FIF." should be --FIG.--.

Column 26, line 1 after "second" insert --card--.

Signed and sealed this 1st day of October 1974.

(SEAL)
Attest:

McCOY M. GIBSON JR.
Attesting Officer

C. MARSHALL DANN
Commissioner of Patents